(12) United States Patent
Li et al.

(10) Patent No.: US 11,637,745 B2
(45) Date of Patent: Apr. 25, 2023

(54) CONFIGURING A REMOTE ELECTRONIC DEVICE BY A PEER ELECTRONIC DEVICE IN A NETWORKED ENVIRONMENT

(71) Applicant: Hand Held Products, Inc., Fort Mill, SC (US)

(72) Inventors: Chen Li, Suzhou (CN); Leon Zhang, Suzhou (CN)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 16/665,769

(22) Filed: Oct. 28, 2019

(65) Prior Publication Data
US 2021/0075671 A1  Mar. 11, 2021

(30) Foreign Application Priority Data
Sep. 11, 2019  (WO) ............... PCT/CN2019/105426

(51) Int. Cl.
*H04L 41/0806* (2022.01)
*H04L 41/0816* (2022.01)
(Continued)

(52) U.S. Cl.
CPC ...... *H04L 41/0806* (2013.01); *H04L 41/0816* (2013.01); *H04L 63/0428* (2013.01);
(Continued)

(58) Field of Classification Search
None
See application file for complete search history.

(56) References Cited

U.S. PATENT DOCUMENTS

| 5,535,276 A * | 7/1996 | Ganesan |
| 9,054,961 B1 | 6/2015 | Kim et al. |

(Continued)

FOREIGN PATENT DOCUMENTS

| CN | 104854571 A | 8/2015 |
| JP | 2005-064737 A | 3/2005 |

(Continued)

OTHER PUBLICATIONS

Notice of Amendment issued in Chinese Application No. 202010794377.4, dated Sep. 8, 2020, 2 pages.
(Continued)

*Primary Examiner* — Kevin T Bates
*Assistant Examiner* — Emad Siddiqi
(74) *Attorney, Agent, or Firm* — Alston & Bird LLP

(57) ABSTRACT

A method for configuring multiple electronic devices in a batch, is described. The method can include initializing, by a first computing device a communication network based on a pre-defined configuration parameter. The pre-defined configuration parameter is associated with a first instance of an application on the first computing device. Further, the method includes identifying, by the first computing device, an initialization of a second instance of an application at a second computing device. In response to identifying the initialization of the second instance of the application at the second computing device, the method includes, sending, by the first computing device configuration settings for the second computing device over a secured communication network. In this regard, the configuration settings can comprise at least the pre-defined configuration parameter for configuring the second computing device.

20 Claims, 11 Drawing Sheets

(51) Int. Cl.
*H04L 9/40* (2022.01)
*H04W 12/06* (2021.01)
*H04L 67/00* (2022.01)
*H04W 12/08* (2021.01)
*H04W 12/033* (2021.01)

(52) U.S. Cl.
CPC ............ *H04L 63/061* (2013.01); *H04L 63/08* (2013.01); *H04L 63/20* (2013.01); *H04L 67/34* (2013.01); *H04W 12/033* (2021.01); *H04W 12/06* (2013.01); *H04W 12/08* (2013.01)

(56) References Cited

U.S. PATENT DOCUMENTS

| | | |
|---|---|---|
| 2004/0054899 A1 | 3/2004 | Balfanz et al. |
| 2004/0107366 A1 | 6/2004 | Balfanz et al. |
| 2005/0117750 A1 | 6/2005 | Rekimoto |
| 2007/0197238 A1 | 8/2007 | Nakajima |
| 2009/0249279 A1* | 10/2009 | Bourdon ................... G06F 8/61 717/101 |
| 2013/0243196 A1 | 9/2013 | Hamachi |
| 2014/0028818 A1* | 1/2014 | Brockway, III et al. |
| 2014/0093079 A1 | 4/2014 | Scott et al. |
| 2014/0195654 A1* | 7/2014 | Kiukkonen ............. H04W 8/00 709/220 |
| 2015/0081859 A1* | 3/2015 | Xu ..................... H04L 41/0886 709/222 |
| 2015/0215161 A1 | 7/2015 | Nanthisamy et al. |
| 2016/0006800 A1* | 1/2016 | Summers .............. G06F 9/5055 709/203 |
| 2017/0187425 A1 | 6/2017 | Kuscher et al. |
| 2017/0289271 A1* | 10/2017 | Seed ..................... H04L 67/141 |
| 2018/0213405 A1* | 7/2018 | Jung ................... H04W 12/069 |

FOREIGN PATENT DOCUMENTS

| | | |
|---|---|---|
| JP | 2005-136897 A | 5/2005 |
| JP | 2005-150794 A | 6/2005 |
| JP | 2007-228249 A | 9/2007 |
| JP | 2007-258822 A | 10/2007 |
| JP | 2008-228191 A | 9/2008 |
| JP | 2009-065357 A | 3/2009 |
| JP | 2012-089926 A | 5/2012 |
| WO | 2006/101065 A1 | 9/2006 |
| WO | 2007/108372 A1 | 9/2007 |
| WO | 2019/056752 A1 | 3/2019 |

OTHER PUBLICATIONS

Extended European Search Report issued in European Application No. 20194202.6 dated Feb. 4, 2021, 8 pages.
Decision to Grant issued in Japanese Application No. 2020-139426 dated Sep. 29, 2021, 5 pages.
English Translation of JP Office Action Mdated Sep. 29, 2022 for JP Application No. 2021176282.
JP Office Action dated Sep. 29, 2022 for JP Application No. 2021176282.
CN Office Action dated Dec. 29, 2022 for CN Application No. 202010794377.
English Translation of CN Office Action dated Dec. 29, 2022 for CN Application No. 202010794377.
Intention to grant dated Feb. 17, 2023 for EP Application No. 20194202.

* cited by examiner

CONFIGURING A REMOTE ELECTRONIC DEVICE BY A PEER ELECTRONIC DEVICE IN A NETWORKED ENVIRONMENT

CROSS-REFERENCE TO RELATED APPLICATIONS

This application claims priority to International Application No. PCT/CN2019/105426 filed Sep. 11, 2019, the content of which is incorporated herein by reference in its entirety.

TECHNOLOGICAL FIELD

Example embodiments described herein relate generally to systems, methods, and apparatuses for configuring electronic devices in a networked environment, and, more particularly, to configuring an electronic device by a peer electronic device in the networked environment.

BACKGROUND

Typically, electronic devices (such as, but not limited to, handheld devices, portable data terminals, barcode scanners, RFID readers, imagers, mobile devices, smartphones, laptops, and/or the like) are commissioned and/or configured, before a first use or sometimes periodically, based on a recent update in configuration settings. Commissioning usually refers to a process whereby an electronic device is initialized or customized to operate in a desired manner within a networked environment. Configuration refers to a process whereby configuration data can be downloaded to an electronic device, thereby to allow the device to function appropriately as desired. To this end, depending on the purpose and usage of the electronic device, configuration data can be provided to such electronic device for configuring the electronic device. Configuring the electronic devices has associated limitations and challenges.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relate to a method for configuring a plurality of electronic devices. The method can comprise, initializing, by a first computing device of the plurality of electronic devices, a communication network based on a pre-defined configuration parameter associated with a first instance of an application on the first computing device. The method can further comprise, identifying, by the first computing device, an initialization of a second instance of an application at a second computing device. In this regard, the identification of the second instance of the application to be initialized can be based on a connection request received from the second computing device over the communication network. Further, in response to identifying the initialization of the second instance of the application at the second computing device, the method can comprise sending, by the first computing device, over a secured communication network, configuration settings for the second computing device. In this regard, the configuration settings can comprise at least the pre-defined configuration parameter.

According to some example embodiments, the pre-defined configuration parameter can comprise, at least one of, a network name, a service set identifier (SSID), and a network security type.

In some example embodiments, the method can comprise, encrypting, by the first computing device, the pre-defined configuration parameter by a first key shared amongst the plurality of electronic devices. Further, the method can comprise, scanning, by the first computing device, for an incoming connection request to establish a connection with the first computing device over the communication network. The method can further comprise, receiving, at the first computing device, a connection request from the second computing device. The method can further comprise, authenticating, by the first computing device, the second computing device based on an identification of the pre-defined configuration parameter in the connection request.

According to some example embodiments, the method can also comprise, providing, via a user interface of the first computing device, the pre-defined configuration parameter. Further, the method can comprise, configuring the first computing device based on the pre-defined configuration parameter. In response to configuring of the first computing device, the method can comprise, initializing the communication network to communicate with the plurality of electronic devices. Further, in response to an establishment of the secured communication network between the first computing device and the second computing device, the method can comprise, sharing configuration settings by the first computing device to the second computing device over the secured communication network.

In some example embodiments, the method can comprise, establishing a connection between the first computing device and the second computing device over the secured communication network. The connection can be established to exchange communication data comprising the configuration settings for the second computing device. In this regard, in some example embodiments, the secured communication network can be established based on exchanging a private key, a public key, and a session key between the first computing device and the second computing device.

According to some example embodiments, establishing the secured communication network can be performed based on a method that comprise: receiving, at the first computing device, an encrypted temporary key from the second computing device. In this regard, the encrypted temporary key can correspond to a temporary key encrypted using a public key shared between the first computing device and the second computing device. Further, the method can comprise, decrypting, using a private key of the first computing device, the encrypted temporary key received at the first computing device. The method can further comprise encrypting, by the first computing device, a session key to generate an encrypted session key. The session key can be encrypted using the decrypted temporary key. Furthermore, the method can comprise, sending, by the first computing device, the encrypted session key to the second computing device. The method can further comprise, by the first computing device, a configuration request received from the second computing device based on identification of the session key in the configuration request. Furthermore, the method to establish the secured communication network can comprise, sending, by the first computing device, communication data comprising the configuration settings. In this regard, the communication data is encrypted using the session key.

In some example embodiments, the configuration settings can correspond to at least one of a volume control setting, a network configuration setting, a sound preference setting, a connection preference setting, associated with the second computing device.

Some example embodiments described herein relate to a system for configuring a plurality of electronic devices. The system can comprise a memory that stores computer-executable instructions. In this regard, the computer-executable instructions on execution can perform operations that can comprise, initializing a communication network based on a pre-defined configuration parameter associated with a first instance of an application on a first computing device. Further, the computer-executable instructions can perform operations that can comprise, sending, over a secured communication network, a configuration setting of the second computing device. This can be done in response to identifying an initialization of a second instance of the application at a second computing device that is communicatively coupled to the first computing device. To this end, the configuration setting referred to herein, can comprise at least the pre-defined configuration parameter.

In some example embodiments, the initialization of the second instance of the application at the second computing device can be identified based on receiving a connection request from the second computing device over a communication network.

According to some example embodiments, the pre-defined configuration parameter can comprise at least one of a network name, a service set identifier (SSID), and a network security type.

According to some example embodiments, the processing unit can execute the computer-executable instructions to perform operations that can comprise, encrypting the pre-defined configuration parameter by a first key shared amongst a plurality of electronic devices. The plurality of electronic devices referred herein can comprise the first computing device and the second computing device. Further, the computer-executable instructions can perform operations that can comprise scanning for an incoming connection request over the communication network and receiving a connection request to establish a connection with the second computing device. Further, the computer-executable instructions can perform operations that can comprise authenticating the second computing device based on an identification of the pre-defined configuration parameter in the connection request.

In some example embodiments, the system can comprise, a plurality of electronic devices that can comprise the first computing device and the second computing device communicatively coupled over a communication network. In some example embodiments, the first computing device can comprise the memory and the processing unit that executes the computer-executable instructions to perform operations that can comprise, establishing a connection between the first computing device and the second computing device over the secured communication network to exchange communication data comprising the configuration setting of the second computing device.

In some example embodiments, the processing unit can execute the computer-executable instructions to perform operations comprising: establishing the secured communication network based on exchanging a private key, a public key, and a session key between the first computing device and the second computing device.

According to some example embodiments the processing unit can execute the computer-executable instructions to perform operations that can comprise, providing, via a user interface, the pre-defined configuration parameter. The operations can further comprise, configuring the first computing device based on the pre-defined configuration parameter. Furthermore, in response to configuring of the first computing device, the operations can comprise, initializing a wireless access point by the first computing device to communicate with the plurality of electronic devices over the communication network. Furthermore, in some examples, the operations can comprise, sharing a configuration setting of the second computing device over the secured communication network, in response to an establishment of a secured communication network between the first computing device and the second computing device.

According to some example embodiments described herein, the processing unit can execute the computer-executable instructions to perform operations that can comprise, receiving, at the first computing device, an encrypted temporary key from the second computing device. In this regard, the encrypted temporary key corresponds to a temporary key encrypted using a public key shared between the first computing device and the second computing device. Further, the processing unit can execute the computer-executable instructions to perform operations that can comprise, decrypting, using a private key of the first computing device, the encrypted temporary key received at the first computing device. The operations can further comprise, encrypting, by the first computing device, using the decrypted temporary key, a session key to generate an encrypted session key. Furthermore, the operations can comprise, sending, by the first computing device, the encrypted session key to the second computing device and validating, by the first computing device, a configuration request received from the second computing device based on identification of the session key in the configuration request. In some examples, the operations can further comprise, sending, by the first computing device, communication data comprising the configuration settings. In this regard, the communication data can be encrypted using the session key.

In some example embodiments, the configuration settings can correspond to at least one of a volume control setting, a network configuration setting, a sound preference setting, a connection preference setting, associated with the second computing device.

Some example embodiments described herein relate to a non-transitory computer-readable medium that stores thereon computer-executable instructions. The computer-executable instructions in response to execution by a processor can perform operations that can comprise, initializing, by a first computing device, a wireless access point based on a pre-defined configuration parameter associated with a first instance of an application on the first computing device. Further, the operations can comprise, identifying, by the first computing device, an initialization of a second instance of the application at a second computing device based on a connection request received from the second computing device to connect with the wireless access point. Furthermore, the operations can comprise, in response to identifying the initialization of the second instance of the application at the second computing device, sending, by the first computing device, over a secured communication network, configuration settings for the second computing device.

According to some example embodiments, the computer-executable instructions that in response to execution by a processor, can perform operations that can further comprise, encrypting, the pre-defined configuration parameter by a first key shared amongst the plurality of electronic devices. The operations can further comprise, scanning, for an incoming connection request from an electronic device of the plurality of electronic devices to establish a connection with the wireless access point. Furthermore, the operations can comprise, authenticating, the electronic device based on identification of the pre-defined configuration parameter in the connection request.

In some example embodiments, the pre-defined configuration parameter can comprise at least one of a network name, a service set identifier (SSID), and a network security type associated with the wireless access point. Further, in some example embodiments, the configuration settings can correspond to at least one of a volume control setting, a network configuration setting, a sound preference setting, a connection preference setting, associated with the second computing device.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
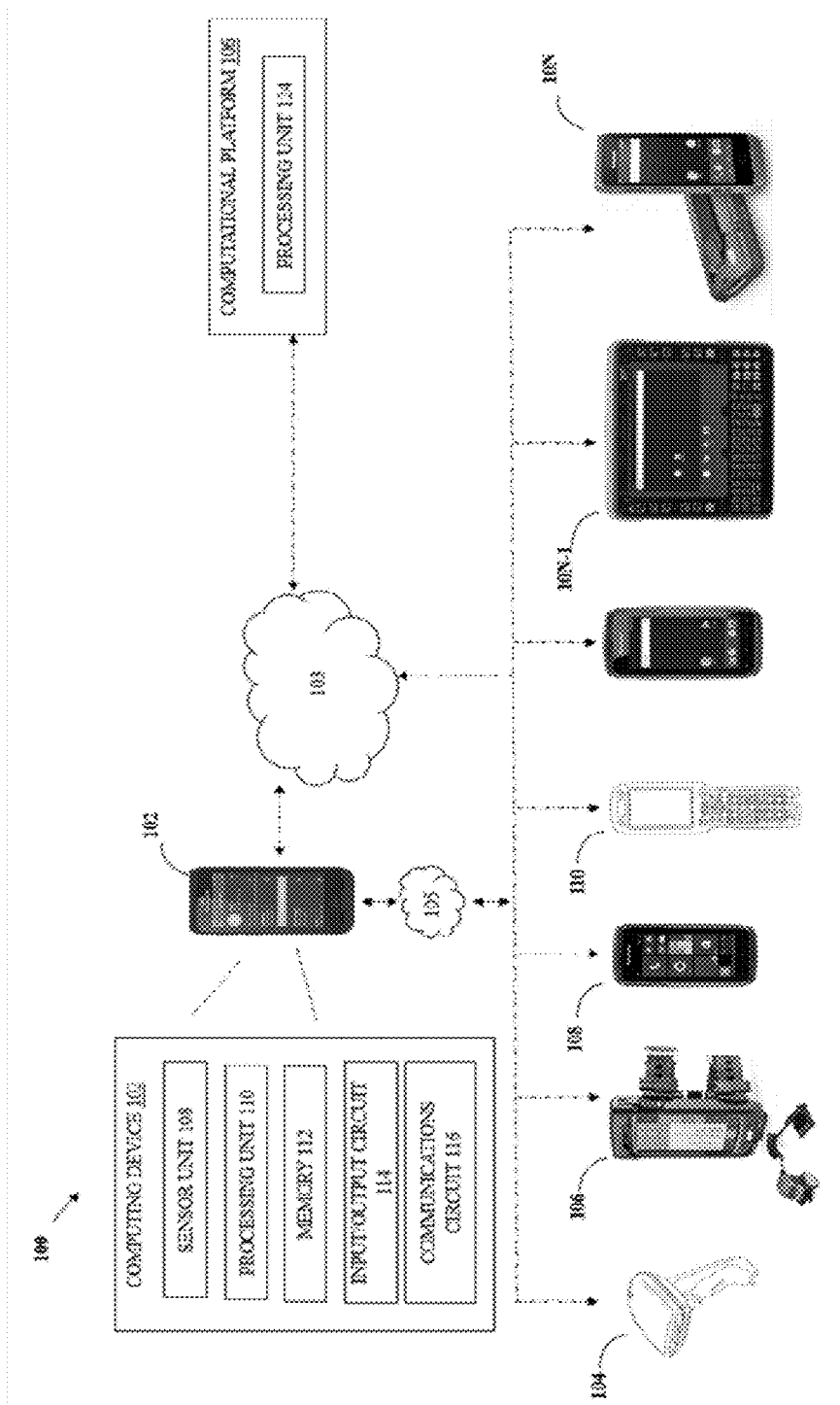
FIG. 1 illustrates an exemplary system comprising a plurality of electronic devices that comprises a computing device to be configured, in accordance with some example embodiments described herein.

Some embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

The term "computing device" or "client device" or "electronic device" used interchangeably hereinafter, to refer to any or all of programmable logic controllers (PLCs), programmable automation controllers (PACs), industrial computers, desktop computers, personal data assistants (PDAs), laptop computers, tablet computers, smartbooks, palm-top computers, personal computers, barcode readers, scanners, indicia readers, imagers, Radio-frequency identification (RFID readers or interrogators), vehicle-mounted computers, wearable barcode scanners, wearable indicia readers, a point of sale (POS) terminal, headset devices, and similar electronic devices equipped with at least a processor configured to perform the various operations described herein.

In some example embodiments, the computing device can refer to an electronic device with more processing and data storage capabilities, as compared to the electronic device. In this regard, in some example embodiments, the electronic device can correspond to an electronic device that can operate on low power and with lesser computational and data storage resources.

The various embodiments are described herein using the term "computing platform" or "master device" used interchangeably for the purpose of brevity. The term "computing platform" can be used herein to refer to any computing device or a distributed network of computing device capable of functioning as a server, such as a master exchange server, web server, mail server, document server, or any other type of server. A computing platform may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smartphone, thereby enabling it to function as an Internet server (e.g., an enterprise e-mail server) only to the extent necessary to provide the functionality described herein.

In some example embodiments, the computing platform may correspond to any of, an industrial computer, a cloud computing-based platform, an external computer, a stand-alone computing device, and/or the like. In some example embodiments, the master device or the computing platform, can also refer to any of the electronic devices, as described herein.

The term "access point" refers to a gateway device in a network of electronic devices that can be capable of communicating directly with one or more electronic devices and can also be capable of communicating (either directly or alternatively indirectly via a communication network such as the Internet) with a network establishment service (e.g. Internet service provider). The network establishment service can refer to a server system that can manage the deployment of one or more electronic devices throughout a physical environment. Network establishment service may be distributed systems where multiple operations are performed by utilizing multiple computing resources deployed over a network and/or a cloud-based platform or cloud-based services, such as any of a software-based service (SaaS), infrastructure-based service (IaaS) or platform-based service (PaaS) and/or like. According to some example embodiments described herein, any electronic device can operate as an access point having capabilities described herein.

Typically for configuring electronic devices, configuration data can be provided to an electronic device by an administrator (e.g. a server or a remote device). For example, in some cases, the electronic device can be configured by bringing the electronic device to a service center or a support center and performing configuration manually. To this end, manually configuring the electronic device can include physically connecting a master device (e.g. a laptop computer or PDA) to the electronic device and uploading configuration data from the master device to the electronic device. However, this can be challenging and undesirable, as it requires a readily accessible connection interface (such as a serial port, USB port, or a parallel port). Further, it also requires a latest or desired version of configuration data to be available at the master device at a given point of time, and typically a reasonable degree of technical expertise to implement.

Alternatively, in some instances, configuration data can be provided to the electronic device by the master device (e.g., a remote device or a server) over a communication network. In such cases, the electronic device can be self-configured, as the electronic device receives configuration data from the remote device. However, providing configuration data over the communication network for configuring electronic devices presents practical difficulties, for instance, failure or fault at a remote device, unavailability of the remote device, or issues with network bandwidth, and/or the like.

Various example embodiments described herein relate to a method for configuring a plurality of electronic devices, using a computing device that is from amongst the plurality of electronic devices. Said differently, according to example embodiments described herein, a first electronic device in a batch of multiple electronic devices can be configured first and can cause configuring of remaining of the electronic devices in a networked environment. In this regard, a first computing device (e.g., but not limited to, a first industrial device) of the plurality of electronic devices can be configured to initiate a communication network (e.g., but not limited to, a wireless access point or a wireless hotspot). In this regard, using the communication network remaining of the plurality of electronic devices (e.g. other industrial devices) may communicate with the first computing device. In some examples, the first computing device can initialize the communication network based on at least a configuration parameter (e.g. a network name, a secure service set identifier (SSID), and/or a network security type (e.g. WPA2 PSK). The configuration parameter can be encrypted and known to remaining electronic devices. To this end, in some example embodiments, the communication network can be initialized based on an initiation of a first instance of an application (e.g. a mobile application) at the first computing device. Also, the pre-defined configuration parameter can be associated with the first instance of the application on the first computing device.

Further, in some example embodiments, the first computing device can identify an initialization of a second instance of the application at a second computing device. Said differently, the first computing device can identify that a second instance of the same application (that may be executed before on the first computing device) is initialized at the second computing device. In this regard, in response to identification of the second instance of the application at the second computing device, the first computing device may send configuration settings of the second computing device over a secured communication network to the second computing device. According to some example embodiments described herein, the secured communication network is established between the first computing device and the second computing device using a secured key exchange process, details of which would be described later in the description.

By way of implementation of various example embodiments described herein, a plurality of electronic devices can be configured and commissioned in batches, at any instance of time. The electronic devices can be configured using various instances of a same application that can be executed on respective of the plurality of electronic devices 102-10N. To this end, according to various example embodiments described herein, a first instance of the application can be initiated on the first computing device (for instance, in response to an initial boot or manually based on user's inputs) to configure the first computing device. As the first computing device is configured, remaining electronic devices can be automatically or self-configured based on (a) initialization of various instances of the same application starting on the remaining devices and (b) finding of information of the initialization of second and subsequent instances of the same applications at other devices, from the first instance of the application running on the first computing device. In this regard, in some examples, various instances of the same application and be self-initialized, in response to an initial boot of the remaining of the plurality of electronic devices 102-10N respectively.

FIG. 1 illustrates an exemplary system 100 comprising a plurality of electronic devices (102, 104 . . . 10N) that may be in a networked environment, in accordance with some example embodiments described herein. The plurality of electronic devices 102-10N can comprise a computing device 102 that is to be configured, e.g., for a first use or based on a periodic change in configuration settings, in accordance with some example embodiments described herein. In accordance with various example embodiments, upon configuration, the computing device 102 can operate as a master device to share configuration settings to configure remaining of the plurality of electronic devices 102-10N. According to some example embodiments, the networked environment referred herein, may correspond to a peer-to-peer (P2P) network of electronic devices 102-10N that may be communicatively coupled over a communication network 103. To this end, the plurality of electronic devices 102-10N in the networked environment may correspond to such devices that may be commissioned and/or configured to perform a particular functionality in a working environment, e.g. industrial environment. For instance, in some examples, the plurality of electronic devices 102-10N may correspond to industrial devices e.g. handheld devices, indicia scanners, RFID readers, PDTs and/or the like, that may be used by workers working in the industrial environment, e.g. but not limited to, a warehouse, a manufacturing plant, or a distribution center.

As illustrated, one or more of the plurality of electronic devices 102-10N can be communicatively coupled to remaining of the plurality of electronic devices 102-10N over a communication network 103. The communication network 103, in some example embodiments can correspond to a medium through which content and messages can flow between various electronic devices in the system 100 or the networked environment (e.g., the computing device 102 and/or the plurality of electronic devices 102-10N).

In some example embodiments, the communication network 103 may include, but are not limited to, a Wireless Fidelity (Wi-Fi) network, a Piconet, a Personal Area Network (PAN), Zigbee, and a Scatternet. In some examples, the communication network 103 may correspond to a short range wireless network through which the plurality of electronic devices 102-10N may communicate with each other using one or more communication protocols such as, but are not limited to, Wi-Fi, Bluetooth, Bluetooth low energy (BLE), Zigbee, and Z-Wave. In some examples, the communication network 103 can correspond to a network in which the plurality of electronic devices 102-10N may communicate with each other using other various wired and wireless communication protocols such as Transmission Control Protocol and Internet Protocol (TCP/IP), User Datagram Protocol (UDP), and 2G, 3G, or 4G communication protocols. In some examples, the communication network 103 can correspond to any communication network such as, but not limited to, LORA, cellular (NB IoT, LTE-M, Leaky Feeder Coax, etc.)

According to various example embodiments described herein, any electronic device (e.g., but not limited to, the computing device 102) of the plurality of electronic devices 102-10N can initialize the communication network 103 through which one or more of the plurality of electronic devices 102-10N may communicate with the computing device 102. In some example embodiments, the communication network 103 can be initialized by the first computing device 102-1. For instance, in some examples, upon booting the first computing device or after a system reset or after a periodic system update, an instance of a mobile application or a system process or a service, on the first computing device may facilitate initialization or setting up the communication network 103.

Alternatively, and/or additionally, in some example embodiments, the computing device 102 may initialize the communication network 103 based on triggering of an event, such as, but not limited to, a user input, or scanning of some configuration indicia, etc. In this regard, in some examples, the user can provide inputs indicative of the computing device 102 to operate as a master device, thereby initializing the communication network 103. To this end, according to some examples, an electronic device of the plurality of electronic devices 102-10N that initializes the communication network 103 can be configured as an access point (e.g. a Wi-fi access point or a Wi-fi hotspot) to which remaining of the plurality of electronic devices may establish connection.

In accordance with some example embodiments, any of one or more of the plurality of electronic devices 102-10N may cause configuration of remaining of the plurality of electronic devices 102-10N that are communicatively coupled with each other via the communication network 103. In this regard, in some example embodiments, the computing device 102 may operate as a master device and can share configuration settings to configure remaining of the plurality of electronic devices 102-10N. To this end, according to some example embodiments described herein, the configuration settings may be shared using a secured communication network 105 (other than the communication network 103) that can be configured to ensure confidentiality and maintain the integrity of the configuration settings shared over the secured communication network 105. In some example embodiments, the secured communication network 105 can correspond to the communication network 103 itself, however, in such a case data such as, configuration settings can be communicated using a secured communication protocol (i.e. based on a secret key exchange process) between a sender (e.g. the first computing device 102) and receiver (e.g. remaining of the plurality of electronic devices 102-10N), details of which are further described. Further details of initialization of the communication network 103 and an establishment of the secured communication network 105 are described in reference to FIGS. 2-10.

Illustratively, the system 100 can also comprise a computational platform 106. In some example embodiments, one or more of the plurality of electronic devices 102-10N may be communicatively coupled to the computing platform 106, via the communication network 103. In some examples, the computational platform 106 can correspond to a remote server or an electronic device used by an administrator in an industrial environment. In some example embodiments, the computational platform 106 can correspond to a data analytics platform that can be configured to receive data from one or more of the plurality of electronic devices 102-10N, perform analysis on the data, and provide actionable insights to the plurality of electronic devices 102-10N. In some example embodiments, the computational platform 106 may generate configuration settings or an update to the configuration settings for the plurality of electronic devices 102-10N.

According to some example embodiments, the computing device 102 can comprise at least one of a processing unit 110, a sensor unit 108, a memory 112, an input/output circuit 114, and a communication circuit 116. In some examples, one or more of the sensor unit 108, the memory 112, the input/output circuit 114, the communication circuit 116 may be communicatively coupled to the processing unit 110. Further, the computational platform 106 may also comprise a processing unit 118 and/or one or more of similar components like the memory 112, the sensor unit 108, the communication circuit 110, the input/output circuit 114, and/or the like as described in reference to the computing device 102.

According to some example embodiments, the processing unit 116 referred herein, can correspond to any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, the processing unit 116 can refer to an integrated circuit, an application-specific integrated circuit (ASIC), a digital signal processor (DSP), a field-programmable gate array (FPGA), a programmable logic controller (PLC), a complex programmable logic device (CPLD), a discrete gate or transistor logic, discrete hardware components, or any combination thereof designed to perform the functions described herein. In some examples, the processing unit 116 can also exploit Nano-scale architectures such as, but not limited to, molecular and quantum-dot based transistors, switches and gates, in order to optimize space usage or enhance performance of user equipment.

In accordance with some example embodiments, the sensor unit 108 may comprise a plurality of sensors, for example, imaging devices, like, a color camera and/or a depth camera, photo eyes, fullness sensors, volume sensors, speed sensors, RFID interrogator, scan engine, barcode scanner, indicia reader, and/or the like.

Further, the communication circuit 116 referred herein, may be configured to receive and/or transmit data from/to a network and/or any other device, circuitry, or module in communication over the communication network 103. To this end, in some example embodiments, the communications circuit 116 referred herein, may be any means such as a device or circuitry embodied in either hardware or a combination of hardware and software associated with the respective component of the system 100. In some examples, the communications circuit 116 may comprise a network interface for enabling communications with a wired or wireless communication network. For example, the communications circuitry may comprise one or more network interface cards, antennae, buses, switches, routers, modems, and supporting hardware and/or software, or any other device suitable for enabling communications via the communication network 103. Additionally, or alternatively, the communications circuit 116 may comprise the circuitry for interacting with the antenna(s) to cause transmission of signals via the antenna(s) or to handle receipt of signals received via the antenna(s). These signals may be transmitted by any of the components of the system 100 and/or the processing unit 110 over the communication network 103, using a number of wireless personal area network (PAN) technologies, such as, but not limited to, Bluetooth® v1.0 through v3.0, Bluetooth Low Energy (BLE), infrared wireless (e.g., IrDA), ultra-wideband (UWB), induction wireless transmission, and/or the like or via a wired communication technology, such as a data field bus, cables etc.

In some example embodiments, the I/O circuit 114 may, in turn, be in communication with the processing unit 110 to provide output to a user and, in some embodiments, to receive an indication of user input. The I/O circuit 114 may comprise a user interface and may comprise a display that may comprise a web user interface, a mobile application, a client device, and/or the like. In some embodiments, the I/O circuit 114 may also comprise a keypad, a joystick, a touch screen, touch areas, soft keys, a microphone, a speaker, or other input/output mechanisms. In some examples, the processing unit 110 and/or a user interface circuitry comprising a processor associated with the I/O circuit 114 may be configured to control one or more functions of one or more user interface elements associated with the I/O circuit 114 through computer program instructions (e.g., software and/or firmware) stored on the memory 112 accessible to the processing unit 110. Further details of the components of the computing device 102 and/or the plurality of electronic devices (102-10N) are also described in reference to FIGS. 9-10.

FIGS. 2 through 5 illustrate, example flowcharts of the operations performed by an apparatus, such as the plurality of electronic devices (102 . . . 10N) of FIG. 1, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for the implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 2 through 5, when executed, convert the computer or processing circuitry into a particular machine configured to perform an example embodiment of the present invention. Accordingly, the operations of FIGS. 2 through 5 can define an algorithm for configuring a computer or processor, to perform an example embodiment. In some cases, a general-purpose computer may be provided with an instance of the processor which performs the algorithm of FIGS. 2 through 5 to transform the general-purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

Figure 2:
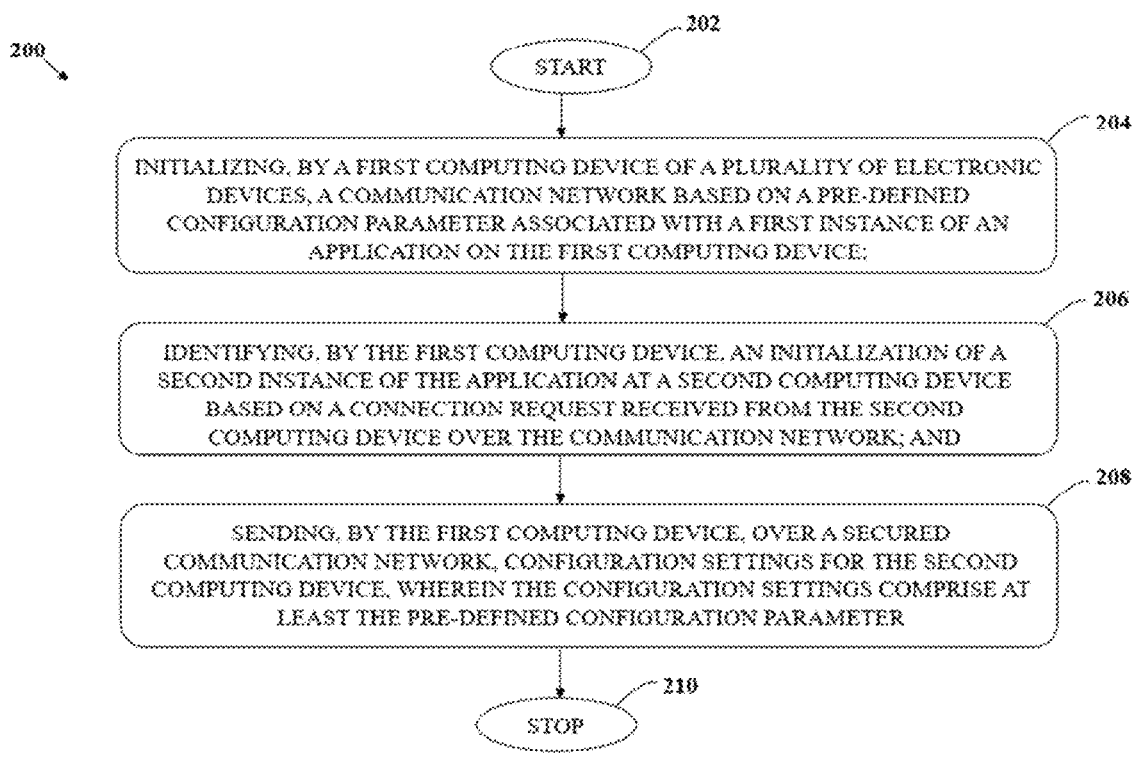
FIG. 2 illustrates an example flowchart representing a method of configuring a computing device, in accordance with some example embodiments described herein.

FIG. 2 illustrates an example flowchart representing a method 200 of configuring a computing device 104, in accordance with some example embodiments described herein. Illustratively, the method 200 starts at step 202. At step 204, the computing device 102 (referred hereinafter, as the first computing device 102) of the plurality of electronic devices 102-10N may comprise means such as, the processing unit 110 to cause initialization of the communication network 103 based on a pre-defined configuration parameter. In some examples, the pre-defined configuration parameter herein corresponds to such parameters (like, but not limited to, SSID, network name, network security type, etc.) based on which an electronic device of the plurality of electronic devices (102-10N) can be configured for using the communication network 103. In some examples, the pre-defined configuration parameter can correspond to configuration parameters provided or selected by a user of the master device. i.e. the first computing device 102.

According to some example embodiments, the pre-defined configuration parameter can be associated with a first instance of an application on the first computing device 102. In this regard, in some examples, the application may correspond to a mobile application or a system process that can be programmed for configuring network settings of the first computing device 102. In some examples, the application may be automatically executed, in response to an initial boot or a firmware update of the first computing device and/or remaining of the plurality of electronic devices 102-10N. Further, in some examples, the application can provide a user interface for setting up the communication network 103 for the first computing device 102. Further details of the user interface of the application are described in reference to FIG. 11.

In some example embodiments, the pre-defined configuration parameter may correspond to a network configuration parameter used for configuring network settings of a communication network through which the electronic device can communicate. For instance, in some examples, the pre-defined configuration can comprise at least one of a network name, a service set identifier (SSID), and a network security type. In this regard, the communication network 103 can be set up based on the pre-defined configuration parameters. In some examples, the communication network 103 can be initialized based on an occurrence of an event. For instance, in some examples, the processing unit 110 may cause to perform initialization of the communication network 103 based on receiving the pre-defined configuration parameters, as an input from a user. In this regard, the processing unit 110 may receive, via the input/output circuit 114, the inputs corresponding to the pre-defined configuration parameters from the user.

In some example scenarios, the communication network 103 can be initialized in a networked environment, where multiple electronic devices can be commissioned by an administrator such that the electronic devices can be used to perform a series of defined steps of an industrial operation. In this regard, the pre-defined parameters for setting up the communication network 103 may be pre-shared or known amongst trusted electronic devices within the networked environment, so that only trusted devices can utilize the communication network 103 for data communication.

Moving to step 206, the first computing device 102 may comprise means such as, the processing unit 110 to identify an initialization of a second instance of the application at a second computing device 104 of the plurality of electronic devices (102-10N). In this regard, in some examples, the first computing device 102 may identify the initialization of the second instance of the application at the second computing device 104 based on receiving a connection request from the second computing device 104. To this end, according to some examples, the initialization of the communication network 103 at step 204, may cause the first computing device 102 to operate as a wireless access point. In this regard, remaining electronic devices of the plurality of electronic devices 102-10N can attempt to establish a connection with the wireless access point. Accordingly, at step 206, the first computing device 102, may receive such connection requests for establishing a connection with the first computing device 102 and to communicate via the communication network 103, from one or more of the plurality of electronic devices 102-10N.

Moving to step 208, the first computing device 102 may comprise means, such as the processing unit 110 that can cause to send configuration settings for the second computing device 104, via a secured communication network 105. In this regard, in some example embodiments, the configuration settings may comprise at least the pre-defined configuration parameter based on which the first computing device 102 initializes the communication network 103. Said differently, the first computing device 102 can share same configuration settings based on which it initialized the communication network 103 with the second computing device 104, so that the second computing device 104 can also use the same communication network 103 for data communication. Said differently, in accordance with some example embodiments, the second computing device 104 may receive the configuration settings to configure its communication circuit (e.g. similar to the communication circuit 116) so that the second computing device 104 can connect over the communication network 103 and utilize it for data communication.

In some examples, the communication network 103 can correspond to a wireless network. To this end, initialization of the wireless network may involve configuring a Wi-fi hotspot at the first computing device 102. In this aspect, the second computing device 104 may send a connection request to the first computing device 102 to connect with the Wi-Fi hotspot. Further, in response to connecting with the Wi-Fi hotspot, the first computing device 102 can share configuration settings (e.g. network settings that can include SSID, network name, network security type, a passcode etc.) with the second computing device 104 via the secured communication network 105. The configuration settings can be used at the second computing device 104 for configuring the second computing device 104. The method 200 stops at step 210.

Figure 3:
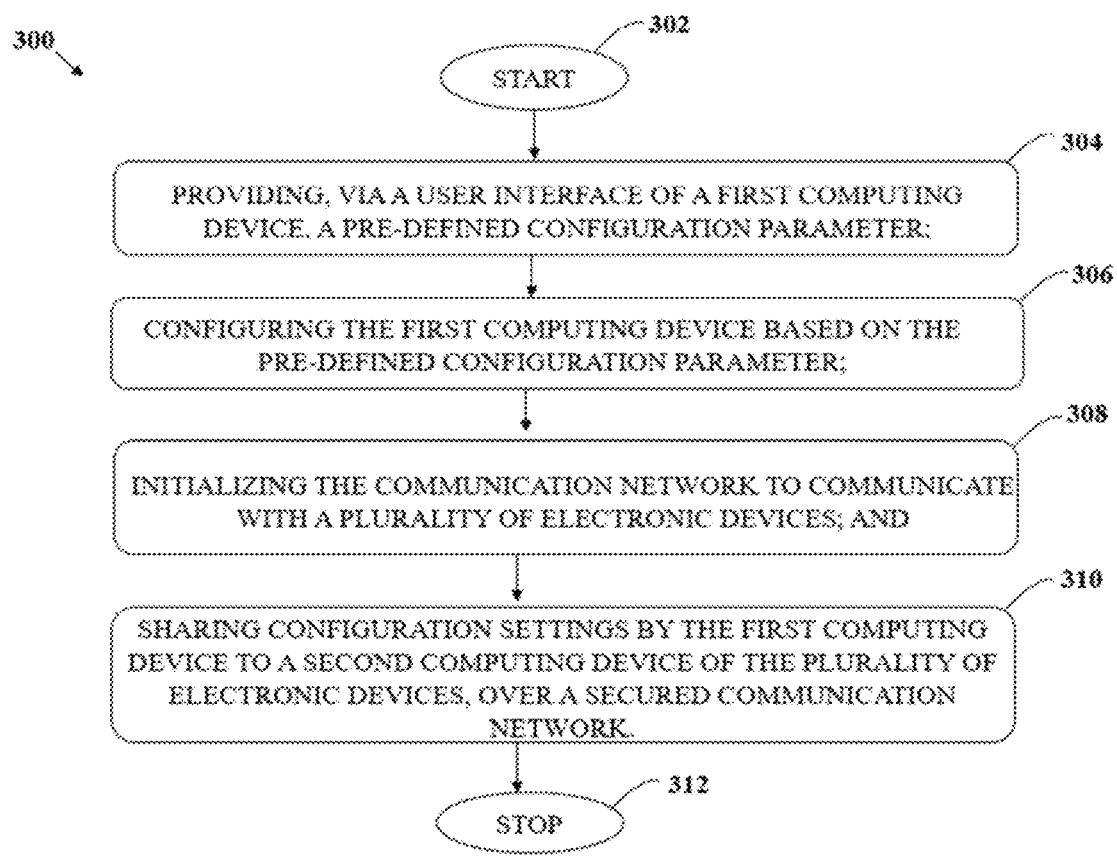
FIG. 3 illustrates an example flowchart representing a method of configuring a first computing device to initiate a communication network for communication with a plurality of electronic devices, trusted by the first computing device, in accordance with some example embodiments described herein.

FIG. 3 illustrates an example flowchart representing a method 300 of configuring the first computing device 102 to initiate the communication network 103 used for communication with the plurality of electronic devices (102-10N) that can be trusted by the first computing device 102, in accordance with some example embodiments described herein.

The method starts at step 302. At step 304, the first computing device 102 can comprise means such as, a user interface of the input/output circuit 114 to provide a pre-defined configuration parameter to the processing unit 110. The pre-defined configuration parameter may comprise parameters for associating with an access point (e.g. a wireless access point) provided by the first computing device 102. For example, the pre-defined parameter can be network configuration settings comprising at least one of, a network name, a user name, a password, a network security type, an SSID, and/or the like, commonly used for configuring the communication network 103. In some examples, the pre-defined parameter may be encrypted, pre-defined, and known to one or more trusted devices in a networked environment so that trusted devices can utilize it for network configuration and non-trusted devices cannot use it.

According to various some example embodiments described herein, a scope of the present disclosure may not be limited to the pre-defined parameter to be network parameters, rather, the pre-defined parameter may correspond to any configuration parameter based on which the first computing device 102 can be configured to operate a desired functionality. For instance, in some examples, the pre-defined parameter provided by the user interface may correspond to a system parameter associated with operations of the first computing device such as, a selection of a system language, a network connection preference to be used as a default setting, sound preferences for the first computing device 102, an indicia scanning setting, a barcode configuration setting, and/or the like. Further details of providing the pre-defined configuration parameter with the user interface of the first computing device 102 are described in reference to FIGS. 11-13.

At step 306, the first computing device 102 may comprise means such as, the processing unit 110 to configure the first computing device 102 based on the pre-defined configuration parameter by the user interface at step 304. At step 308, the first computing device 102 may comprise means such as, the processing unit 110 to initialize the communication network 103. Accordingly, in response to initialization of the communication network 103, the first computing device 102 may communicate with one or more of the plurality of electronic devices 102-10N. Initialization of the communication network 103, according to some example embodiments, can correspond to activation of a network access point (e.g. a Wi-fi hotspot) by the first computing device 102. In this regard, in some examples, the access point may be configured to provide a network access (e.g. internet access) provisioned by an Internet service provider (ISP) or a wireless local area network to one or more of the plurality of electronic devices 102-10N in a networked environment.

Moving to step 310, the processing unit 110 of the first computing device 102 may cause to share, via the communications circuit 116, configuration settings to the second computing device 104 over the secured communication network 103. In this regard, for sharing the configuration settings, according to some example embodiments, the first computing device 102 may establish a secured connection with the second computing device 104 so that the configurations settings are not compromised during transit or lose confidentiality. To this end, the configuration settings may be shared over the secured communication network 105 established between the first computing device 102 and the second computing device 104 based on a secured key exchange process details of which are described in reference to FIG. 4. The method stops at step 312.

In accordance with some example embodiments, it may be desired that the communication network 103 initialized by the first computing device 102 (e.g., as described at step 308 of FIG. 3 or step 204 of FIG. 2) may be used by a trusted or commissioned device of the plurality of electronic devices 102-10N, and not by a malicious or non-recognized electronic device. Further, it may also be desired to maintain confidentiality and integrity of the configuration settings while the settings are shared at step 310 between two electronic devices (e.g. the first computing device 102 and the second computing device 104). Said differently, the configuration settings may be shared by the first computing device 102, in response to a determination that the second computing device 104 is a trusted device and not a malicious node of a networked environment. In this regard, in accordance with some example embodiments, the first computing device 102 may authenticate the second computing device 104 to be a trusted device, details of which are explained in reference to FIG. 4.

Figure 4:
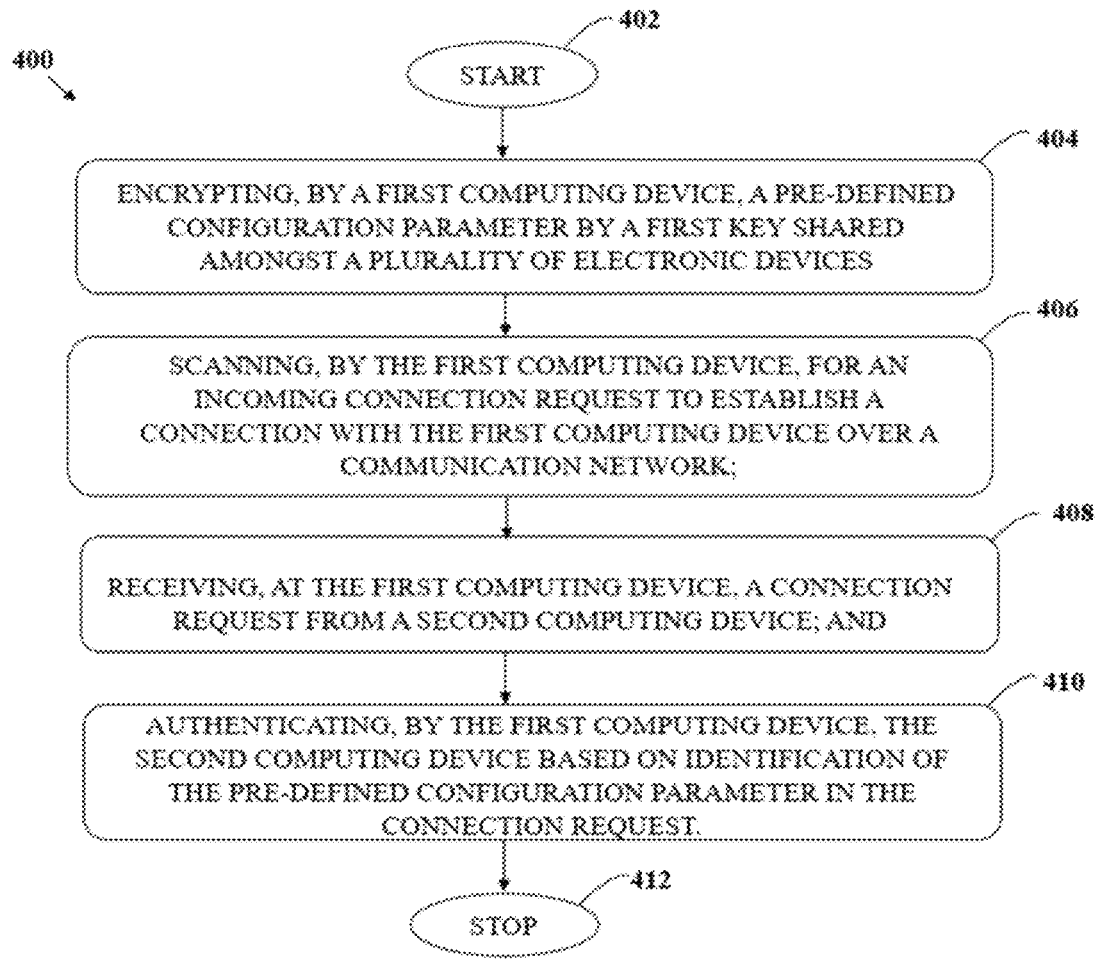
FIG. 4 illustrates an example flowchart representing a method of authenticating a second computing device by the first computing device to use the communication network initialized by the first computing device, in accordance with some example embodiments described herein.

FIG. 4 illustrates an example flowchart representing a method 400 of authenticating the second computing device 104 by the first computing device 102 to use the communication network initialized by the first computing device, in accordance with some example embodiments described herein. The method 400 starts at step 402. At step 404, the first computing device may comprise means such as, the processing unit 110 to encrypt a pre-defined configuration parameter by a first key shared amongst the plurality of electronic devices 102-10N. For example, the first computing device 102 may encrypt one or more of the network name, the SSID, the passcode, and/or the like, using the first key.

In some examples a public key and a corresponding private key pair may be shared and known amongst trusted devices. For instance, the public key and private key information may be shared amongst trusted electronic devices at a time of manufacturing of the electronic devices, by an original equipment manufacturer (OEM) or during a firmware configuration of the electronic devices. In some examples, the first key may correspond to a private key of the first computing device 102 that can be used by the first computing device to encrypt the pre-defined configuration parameter. According to some example embodiments, the pre-defined configuration parameter may be encrypted by the first computing device 102 after configuring the initialization of the communication network 103. Said differently, the first computing device 102 may initiate the access point for communication and subsequently can encrypt the configuration parameters that are to be used for connecting with the access point.

At step 406, the processing unit 110, may cause to scan via the communications circuit 116, an incoming connection request to establish a connection with the first computing device 102 over the communication network 103. In this regard, the processing unit 110 can wait for incoming connection requests for connecting with the access point.

Moving to step 408, the processing unit 110 may receive via the communications circuit 116, the connection request from the second computing device 104. In some examples, the incoming connection request may correspond to a TCP/IP handshake request by the second computing device 104 for establishing a connection with the first computing device. In this regard, the incoming connection request may include fields such as, a source address, a destination address, a physical address (MAC address) of a source, payload information, and other such information.

At step 410, the first computing device 102 may comprise means such as, the processing unit 110 to authenticate the second computing device 104 based on identification of the pre-defined configuration parameter in the connection request. In this regard, the processing unit 110 may cause to parse the connection request received at step 408, to determine at least the pre-defined configuration parameter to be present in the connection request.

For instance, in some examples, the connection request may include at least one of, the SSID, the network name, the passcode, and/or the like, used by the first computing device 102 to initialize the communication network 103. As the pre-defined configuration parameters are encrypted by the first computing device 102, identification of the pre-defined configuration parameters in the connection request, at step 410, can be indicative of a successful decryption of the pre-defined configuration parameter by the second computing device 104. To this end, the second computing device 104 may cause to decrypt the encrypted configuration parameter using a second key (e.g. a public shared amongst trusted devices) and send the connection request including the decrypted configuration parameter to the first computing device. Accordingly, the first computing device 102 may authenticate the second computing device 104 to be a trusted device. In some example embodiments, in response to authentication, the first computing device 102 may cause to share configuration settings with the second computing device 104. The method stops at step 412.

Figure 5:
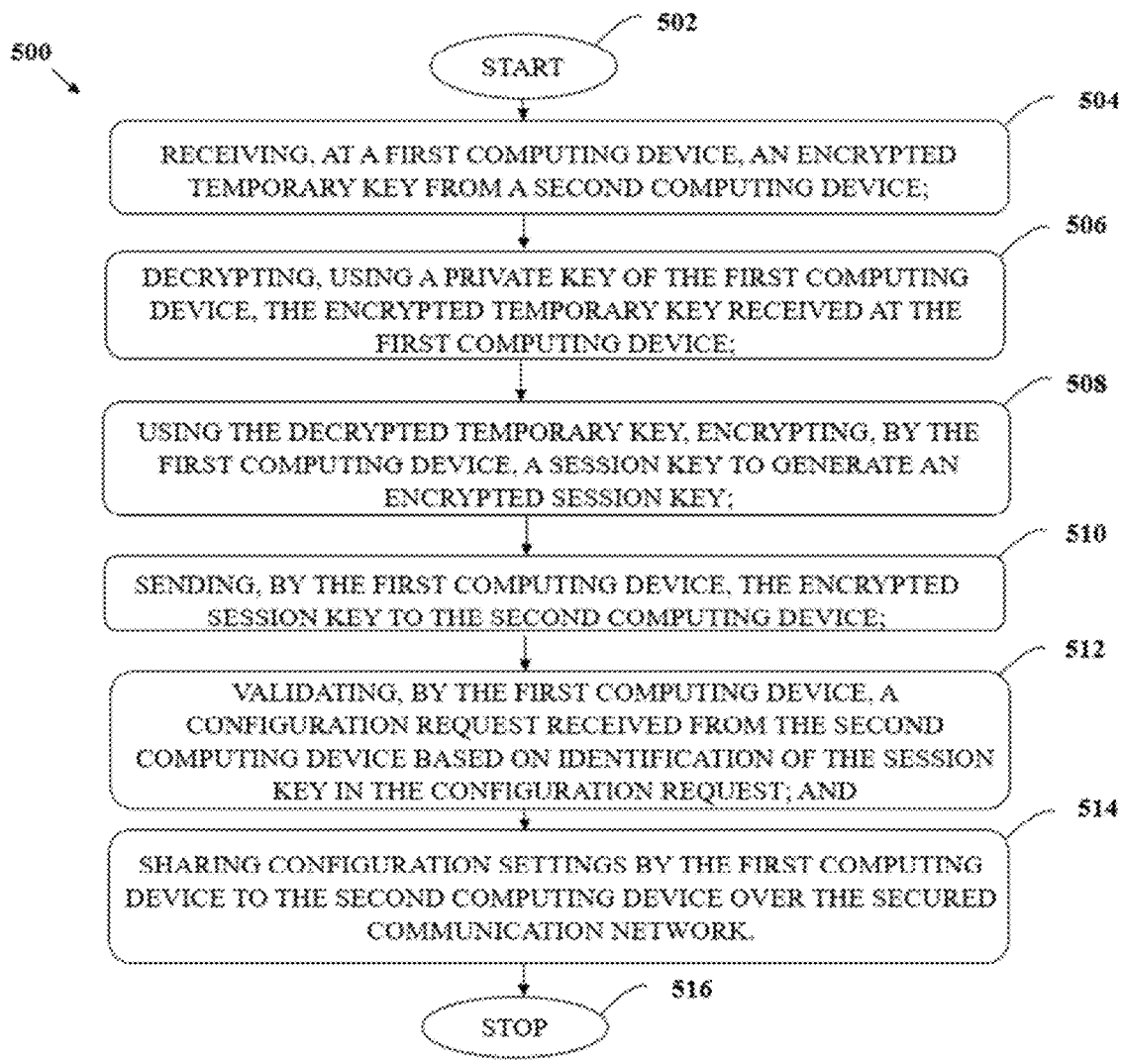
FIG. 5 illustrates an example flowchart representing a method of secured key exchange between the first computing device and the second computing device, in accordance with some example embodiments described herein.

FIG. 5 illustrates an example flowchart representing a method 500 of secured key exchange between the first computing device 102 and the second computing device 104 for sharing configuration settings to the second computing device 104, in accordance with some example embodiments described herein. In accordance with some example embodiments, based on the secured key exchange, the secured communication network 105 may be established and utilized by the plurality of electronic devices 102-10N, thereby enabling data communication and secured sharing of data amongst the plurality of electronic devices 102-10N.

At step 502, the first computing device 102 may comprise means such as, the processing unit 110, to receive via the communications circuit 116, an encrypted temporary key from the second computing device 104. In this regard, the encrypted temporary key corresponds to a temporary key generated by the second computing device 104 and subsequently encrypted by the second computing device 104. In some examples, the encrypted temporary key may comprise any of, numeric, alphabetic, alphanumeric, special characters, and/or a combination thereof.

At step 504, the processing unit 110, may cause to decrypt the encrypted temporary key received from the second computing device 104. In this regard, in some examples, the encrypted temporary key may correspond to a temporary key encrypted by the second computing device 104 using a public key shared amongst the plurality of electronic devices. To this end, in some example embodiments, at step 504, the processing unit 110 may decrypted the encrypted temporary key using a private key of the first computing device 102.

The method at step 508 may comprise, using by the processing unit 110 the temporary key decrypted at step 506, to encrypt a session key. The processing unit 110 can encrypt the session key to generate an encrypted session key. In this regard, the session key may be generated by the processing unit 110 and may be indicative of a session of data communication to be initiated at the first computing device 102.

At step 510, the first computing device 102 may comprise means such as, the processing unit 110 to cause sending, via the communications circuit 116, the encrypted session key to the second computing device. In this regard, in some example embodiments, the encrypted session key may be received by the second computing device and decrypted using the temporary key known to the second computing device. By decrypting the encrypted session key, the second computing device 104 may know of the session key and use it for data communication with the first computing device 102. For instance, in some example embodiments, the second computing device 102 may send a configuration request to the first computing device. In some examples, the configuration request may be indicative of a request for sharing configuration settings of the second computing device 104.

Further, in some examples, at step 512, the processing unit 110 may validate a configuration request received from the second computing device 104. In some examples, the configuration request may comprise, a header, a destination address (e.g. IP address or physical address of the first computing device 102), a source address (physical address or IP address of the second computing device 104), a payload that can comprise a set of configuration parameters associated to requested configuration settings, a flag value identifier that identifies the request to be a request for sharing configuration settings, the session key, and/or the like. In this regard, the processing unit 110 of the second computing device 104 may parse the connection request received from the second computing device 104 and identify the session key in the connection request.

Accordingly, the processing unit 110 may validate the second computing device 104 to be a trusted electronic device, in an instance when the session key is present in the connection request received from the second computing device 104. In some examples, the processing unit 110 may match the session key identified from the connection request with a local version of the session key generated at step 508 by the first computing device 102. Alternatively, the processing unit 110 may flag the second computing device 104 be a non-trusted electronic device in an instance when the session key is not present, or an invalid session key is present in the connection request received at step 512.

Moving to step 514, the processing unit 110, in response to a validation of the second computing device 104 to be a trusted electronic device, the processing unit 110 may share configuration settings to the second computing device 104. Further, in some examples, the configuration settings received from the first computing device 102 may be used for configuring the second computing device 104 for a desired use. The method stops at step 516.

Figure 6:
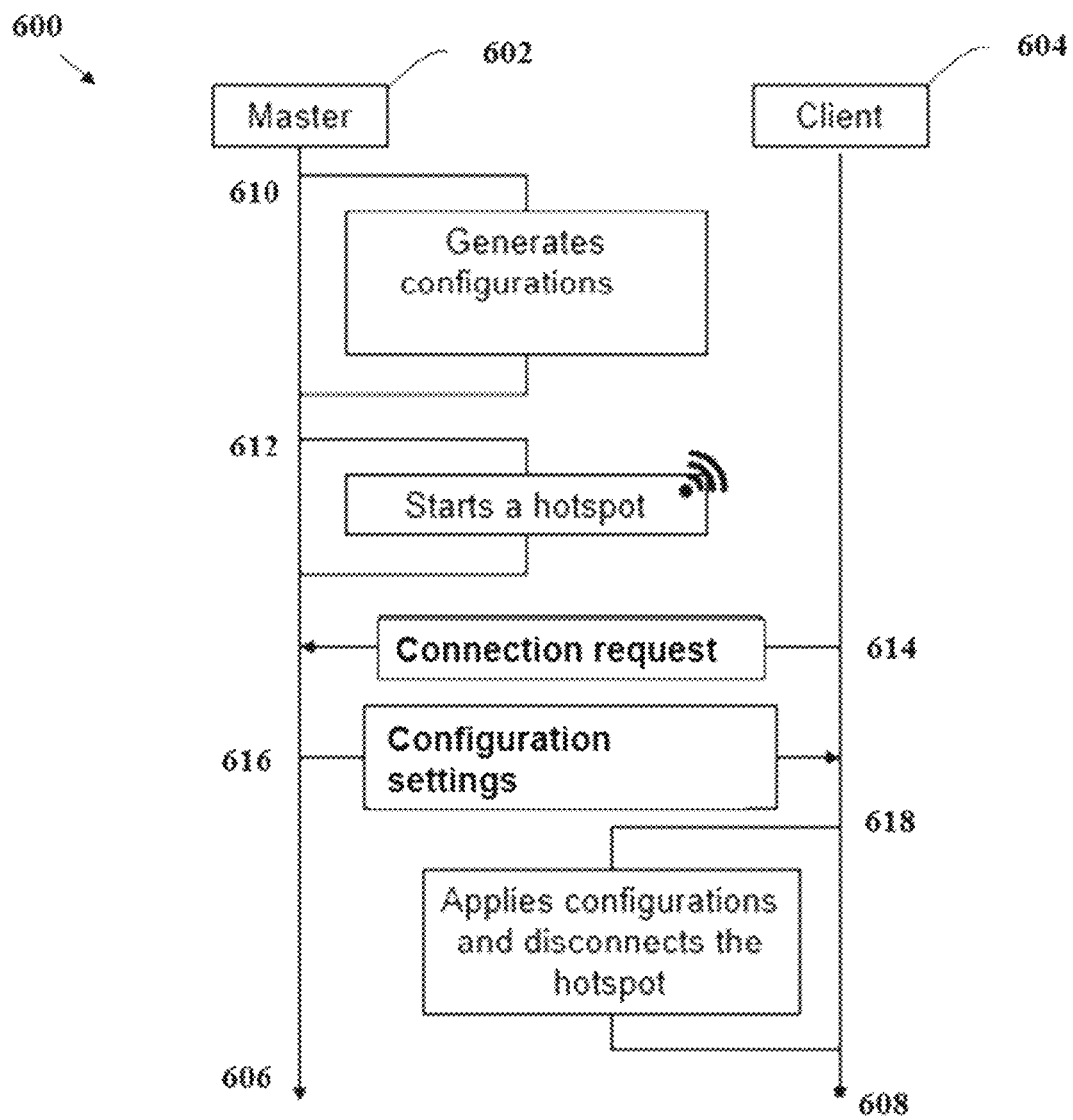
FIG. 6 illustrates an example message flow diagram representing communication between a master device and a client device of the plurality of electronic devices for configuration of the client device, in accordance with some example embodiments described herein.

FIG. 6 illustrates an example message flow diagram 600 representing a communication between a master device 602 and a client device 604, in accordance with some example embodiments described herein. Said differently, the message flow diagram 600 illustrates a sequence of messages and data communication between the master device 602 and the client device 604. According to some examples, a finite set of process threads can be executed at each of the master device 602 and the client device 604 to perform some operation (for example, but not limited to one or more steps of methods 200, 300, 400, and 500 as described in FIGS. 2-5). In this regard, the message flow diagram 600 also represents a finite sequence of events for each process thread that can be executed by a processing unit of the respective device. Illustratively, a process thread that can be executed at the master device 602 is represented by vertical line 606 and a process thread that can be executed at the client device 604 is represented by the vertical line 608. Further, horizontal lines in the message flow diagram 600 represents a message communicated between the master device 602 and the client device 604 or a data handled at the respective device.

According to some example embodiments, the master device 602 and the client device 604 can be from amongst the plurality of electronic devices 102-10N, as described in FIG. 1. For instance, in an example embodiment, the master device 602 can correspond to the first computing device 102 and the client device 604 can correspond to the second computing device 104. Accordingly, the master device 602 can be configured to perform operations as described in reference to the first computing device 102 in FIGS. 1-5 and the client device 604 can be configured to perform operations as described in reference to the second computing device 104 in FIGS. 1-5.

In one example scenario, the plurality of electronic devices 102-10N can be operated in an industrial environment like a warehouse or inventory. In this regard, the plurality of electronic devices 102-10N may be used by workers to increase worker's productivity in performing various operations like, but not limited to, package positioning, refilling shelves, stocking inventory, shipment processing etc. In such cases, workflows comprising steps of a task can be executed in form of visual instructions and/or can be provided to the workers in form of voice-based instructions on the plurality of electronic devices 102-10N. In such an example scenario, the master device 602 can be an electronic device of the plurality of electronic devices 102-10N that can operate as a central server administered by a store manager and the client device 604 can be any electronic device from the plurality of electronic devices 102-10N that can be used by the worker. In this regard, the worker may receive instructions for performing various operations within the inventory on the client device 604 in form of audio and/or visual instructions, to which the worker can respond using the input/output circuit of the client device 604.

In some example embodiments, the master device 602 can correspond to an electronic device that may comprise substantially more resources (e.g. memory, battery life, network connectivity, etc.) as compared to resources of the client device 604. Further, according to some example embodiments, the master device 602 may correspond to an electronic device from amongst the plurality of electronic devices 102-10N, that can be first configured based on pre-defined configuration settings and upon configuration, can further share configuration settings to remaining of the plurality of electronic devices 102-10N.

Illustratively, at step 610, the master device 602 can generate configuration settings. The configuration settings, in accordance with some example embodiments, can correspond to settings for: a network set up configuration (e.g. Wi-fi configuration, wired network configuration), network preference for data transmission settings (e.g. Bluetooth, Wi-fi, NFC, etc.), system sound (e.g., ringtone volume, device volume, call volume, alarm volume, etc.), a system language (e.g., English, Chinese, Hindi, etc.), and other similar device settings. According to some example embodiments, the configuration settings may be generated at the master device 602, in response to receiving inputs, via the input output circuit 114, defining configuration parameters. Alternatively, in some example embodiments, the configuration settings may be auto-generated at a time of initial set up or boot of the master device 602. In some example embodiments, the configuration settings may be generated in response to scanning and decoding of configuration indicia, e.g. a QR code or a barcode provided by an OEM.

Upon generating the configuration settings, the master device 602 can be configured to operate in accordance with configuration parameters defined in the configuration settings. For example, in an instance when the configuration settings correspond to network set up settings, upon configuration, the master device 602 can be initialize a communication network or an access point defined in the configuration settings and can use the communication network for communicating data. According to some examples, the configuration settings can correspond to a wireless network configuration setting based on which the master device 602 can initialize a wireless communication network (e.g. a Wi-fi hotspot or a near field access point). Accordingly, at step 612, the master device 602 can initiate the Wi-fi hotspot to which one or more of the plurality of electronic devices 102-10N can connect for data communication with the master device 602.

At step 614, in some example embodiments, the client device 604 can generate a connection request to connect with the Wi-fi hotspot initialized at the master device 602. In this regard, the connection request can correspond to a message sent from the client device 604 based on a TCP/IP handshaking protocol. In some examples, the connection request can correspond to a data packet comprising, a header, a source address, a destination address, a request identifier, and/or the like. In some example embodiments, the master device 602 can receive the connection request from the client device 604 in a similar fashion as described in reference to FIGS. 2-5. In some example embodiments, the connection request may also comprise an encrypted session key as described in reference to FIG. 5.

In response to receiving the connection request from the client device 604, at step 616, the master device 602 can send configuration settings to the client device 604. The configuration settings may comprise one or more configuration parameters such as, but not limited to, a network name, SSID, a passcode, a network security type, based on which the client device 604 can connect with the Wi-fi hotspot initiated by the master device 602. In some examples, the configuration settings sent from the master device 602 to the client device 604 can also comprise, for example, system sound settings, language setting, power management settings, and/or the like associated with the client device 604. Further, at step 618, the client device 604 can apply the configuration settings and can be configured based on the configuration settings. Further, the client device 604 can disconnect to the Wi-fi hotspot.

Figure 7:
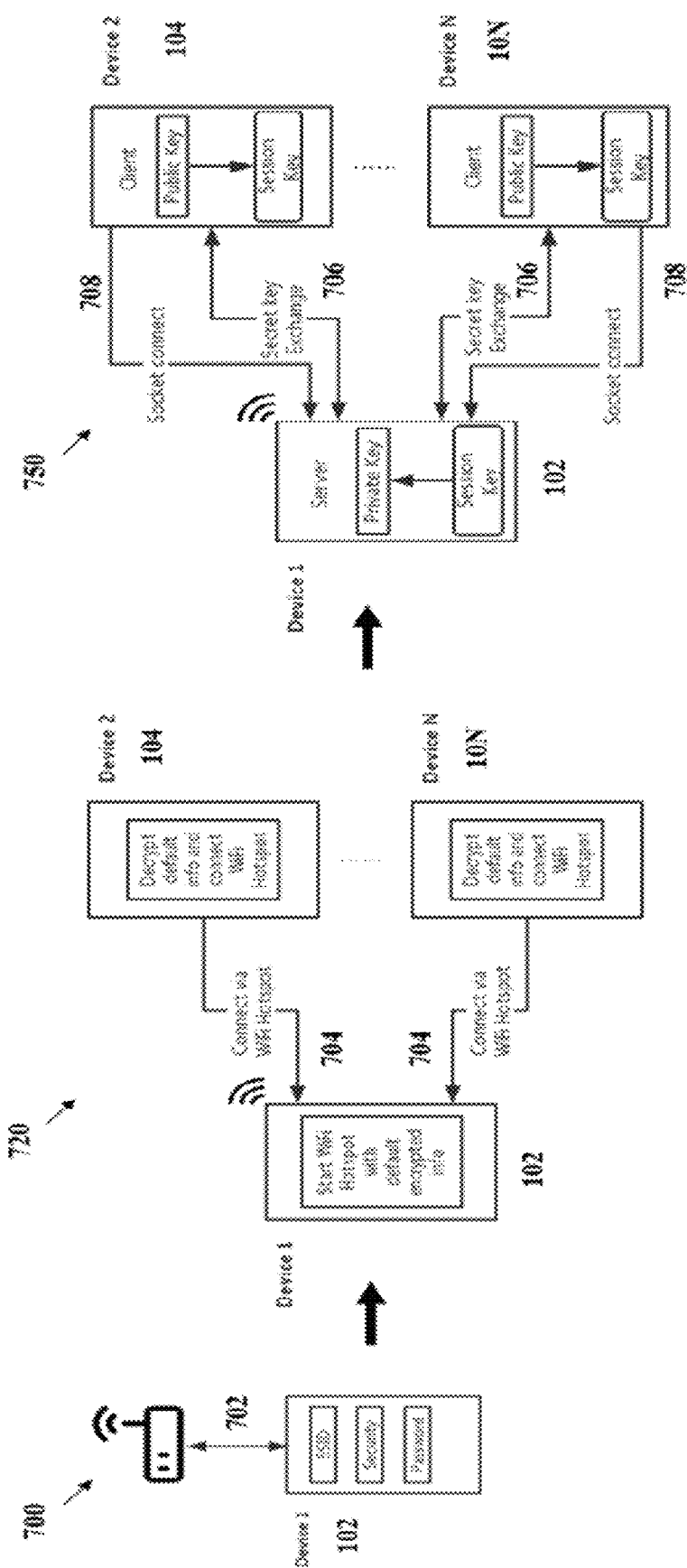
FIG. 7 illustrates an example scenario representing communication between the first computing device and remaining of the plurality of electronic devices for sharing configuration settings over a secured communication network, in accordance with some example embodiments described herein.

FIG. 7 illustrates an example scenario 700 representing a communication between the first computing device 102 and remaining of the plurality of electronic devices 102-10N, in accordance with some example embodiments described herein. Illustratively, a first view 700 depicts, in an instance 702, a wireless access point initialized by the first computing device 102. In some examples, the wireless access point initiated at the first computing device 102 can correspond to a Wi-Fi hotspot. According to some example embodiments, in response to initializing the wireless access point, the communications circuit 116 of the first computing device 102 can utilize the communication network 103 for data communications. To this end, the first computing device 102 can initialize the wireless access point, by performing steps as described in reference to FIGS. 2-6.

For example, in the instance 702, configuration parameters such as, but not limited to, SSID, network security type, a network name, and a password can be defined using the input/output circuit 114 to initialize the wireless access point. In some examples, the wireless access point can be initialized based on encrypted configuration parameters. For instance, in some examples, one or more configuration parameters (like, the network name, the SSID, the password, etc.) can be encrypted for initialization, so that only trusted devices can use the Wi-Fi hotspot for data communication. To this end, keys used for encrypting and decrypting the configuration parameters can be known to trusted devices. In some examples, encrypted configuration parameters can be installed or built-in to all trusted electronic devices by the OEM. In some example embodiments, the connection request from remaining of the plurality of electronic devices 102-10N or a new electronic device by the OEM, can automatically be sent in response to an initial boot of the respective device. To this end, an application that causes generation of the connection request, can automatically be executed (e.g. as a back-end service) upon the initial booth of the remaining of the plurality of electronic devices 102-10N that may be operating as a client device.

The second view 720 illustrates, the first computing device 102 waiting for the remaining of the plurality of electronic devices 102-10N to connect with the wireless access point (e.g. the Wi-fi hotspot). In this regard, in some examples, the first computing device 102 can scan for incoming connection requests from one or more of the plurality of electronic devices 102-10N to connect to the Wi-fi hotspot, in a similar fashion as described at step 406 of FIG. 4. To this end, in an instance 704, one or more electronic devices, for example, the second computing device 104 and a computing device 10N can send communication requests to connect with the Wi-Fi hotspot initialized by the first computing device 102. In some examples, where the second computing device 104 and the computing device 10N are trusted devices, the configuration parameters associated with the Wi-Fi hotspot can be decrypted by second computing device 104 and the computing device 10N to connect with the Wi-Fi hotspot.

A third view 750 schematically illustrates a secret key exchange process amongst the first computing device 102 and the plurality of electronic devices 102-10N that can be performed for sharing configuration settings. In accordance with some example embodiments, upon connecting to the Wi-Fi hotspot (as illustrated in the second view 720) configuration settings for remaining of the plurality of electronic devices 102-10N can be shared by the first computing device 102 over a secured communication channel (e.g. the secured communication network 105). To this end, the secret key exchange process can be performed amongst the plurality of electronic devices 102-10N, illustrated in the third view 750 (i.e. to initiate data communication pertaining to the configuration settings). Said differently, while the plurality of electronic devices 102-10N can initially connect to the Wi-Fi hotspot and communicate over the communication network 103 provided by the Wi-Fi hotspot, however, for sharing configuration settings, data communication may be performed by using secret keys based on the secret key exchange process as described in FIG. 5 and illustrated in the third view 750. Accordingly, the configuration settings can be shared over the secured communication network 105 established amongst the plurality of electronic devices 102-10N based on the secret key exchange process. This can be performed to ensure that the configuration settings can be shared to trusted devices and a malicious device may not intrude into the data communication. As illustrated, in an instance 706, the first computing device 102 and remaining of the plurality of electronic devices 102 can perform the secret key exchange process (as described in FIG. 5) and in another instance 708, establishes a socket connection with the first computing device 102. Further details and sharing of the configuration settings are illustrated and described in FIG. 8.

Figure 8:
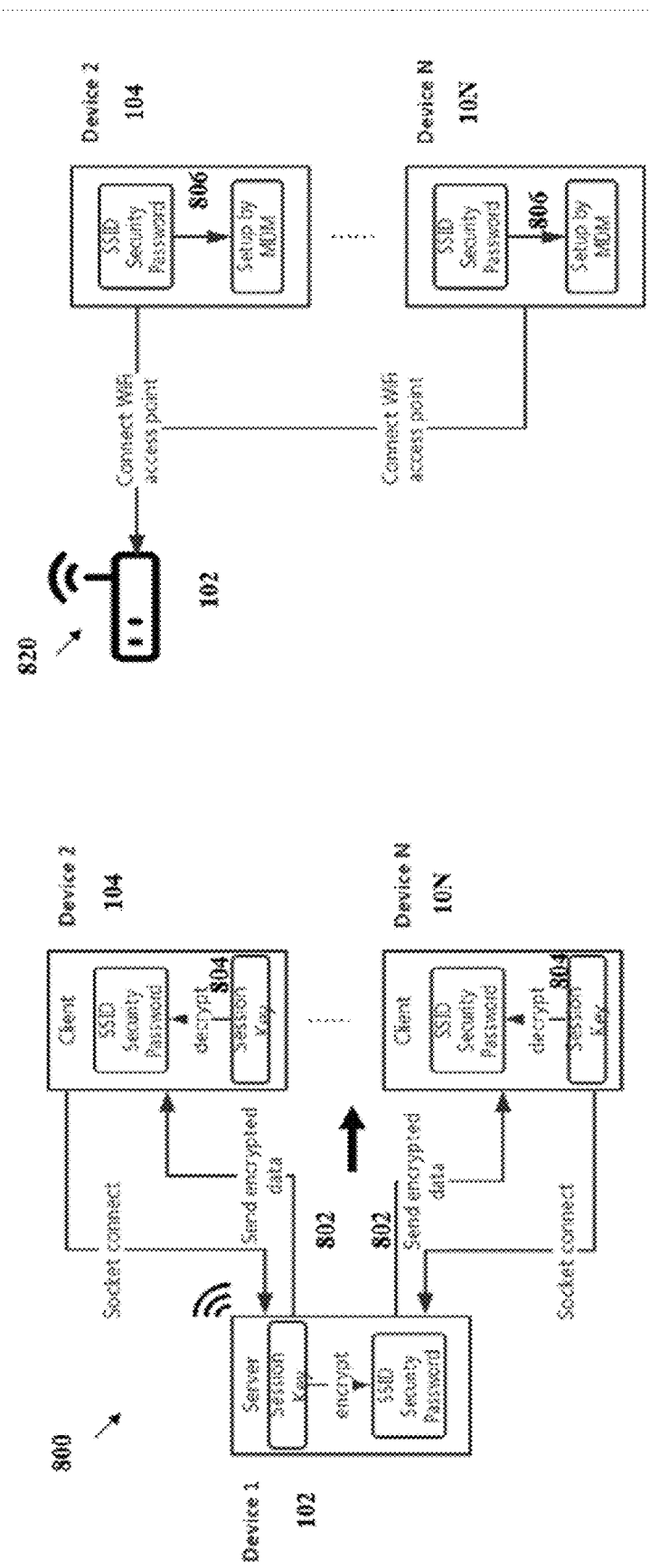
FIG. 8 illustrates another example scenario representing sharing of the configuration settings from the first computing device to remaining of the plurality of electronic devices and configuration set up by the remaining of the plurality of electronic devices, in accordance with some example embodiments described herein.

FIG. 8 illustrates another example scenario representing a first view 800 that illustrates sharing of the configuration settings from the first computing device 102 (e.g. a master device) to remaining of the plurality of electronic devices 104-10N. FIG. 8 also illustrates another example scenario that illustrates, a second view 820 depicting a configuration set up by the remaining of the plurality of electronic devices 104-10N, in accordance with some example embodiments described herein. Illustratively, the first view 800 depicts sending of encrypted data, at step 802, from the first computing device 102 to the remaining of the plurality of electronic devices 104-10N. In this regard, as illustrated, the remaining of the plurality of electronic devices 104-10N can be connected (or establish a socket connection) with the first computing device 102, over the secured communication network 105. Establishing a socket connection can be performed based on a secret key exchange process, using steps as described in reference to FIG. 5. In some example embodiments, the encrypted data may correspond to configuration settings or configuration data to configure the remaining of the plurality of electronic devices 104-10N shared by the first computing device 102. To this end, in some examples, the configuration settings can be encrypted using a session key (e.g. the encrypted session key, as described in reference to FIG. 5).

Further, as illustrated, at step 804, the remaining of the plurality of electronic devices 104-10N can decrypt the encrypted data using the session key to access the configuration settings. In some examples, the configuration settings may include but not limited to, SSID, security password etc. shared by the first computing device 102 to configure the remaining of the plurality of electronic devices 104-10N to use the access point or the hotspot. Accordingly, as illustrated in the second view 820, the remaining of the plurality of electronic devices 104-10N can be configured, at step 806, by using the configuration settings (e.g. the SSID and the security password) decrypted at step 804. In some examples, based on configuration the remaining of the plurality of electronic devices 104-10N can remain connected to the Wi-fi access point or the hotspot initialized at the first computing device 102.

By way of implementation of the embodiments described herein, in an industrial environment, multiple electronic devices (e.g. the plurality of electronic devices 102-10N) can be configured and commissioned simultaneously (e.g. in batches) at an instance of time for a desired use. Said differently, upon configuring one device (e.g. the first computing device 102) remaining electronic devices (e.g. the second computing device 104, the electronic device 104, and so on) can be configured based on configuration settings generated by the first configured device (i.e. the first computing device). In this regard, configuring the plurality of electronic devices 102-10N described herein, can include for example, but not limited to, setting up system language, controlling network priorities (e.g. Bluetooth or NFC), adjusting system volume, controlling device location availability, configuring an electronic device to connect with a specific network, installing an application, configuring the electronic device to download some files from a defined local network, rebooting the electronic device, and/or the like.

Figure 9:
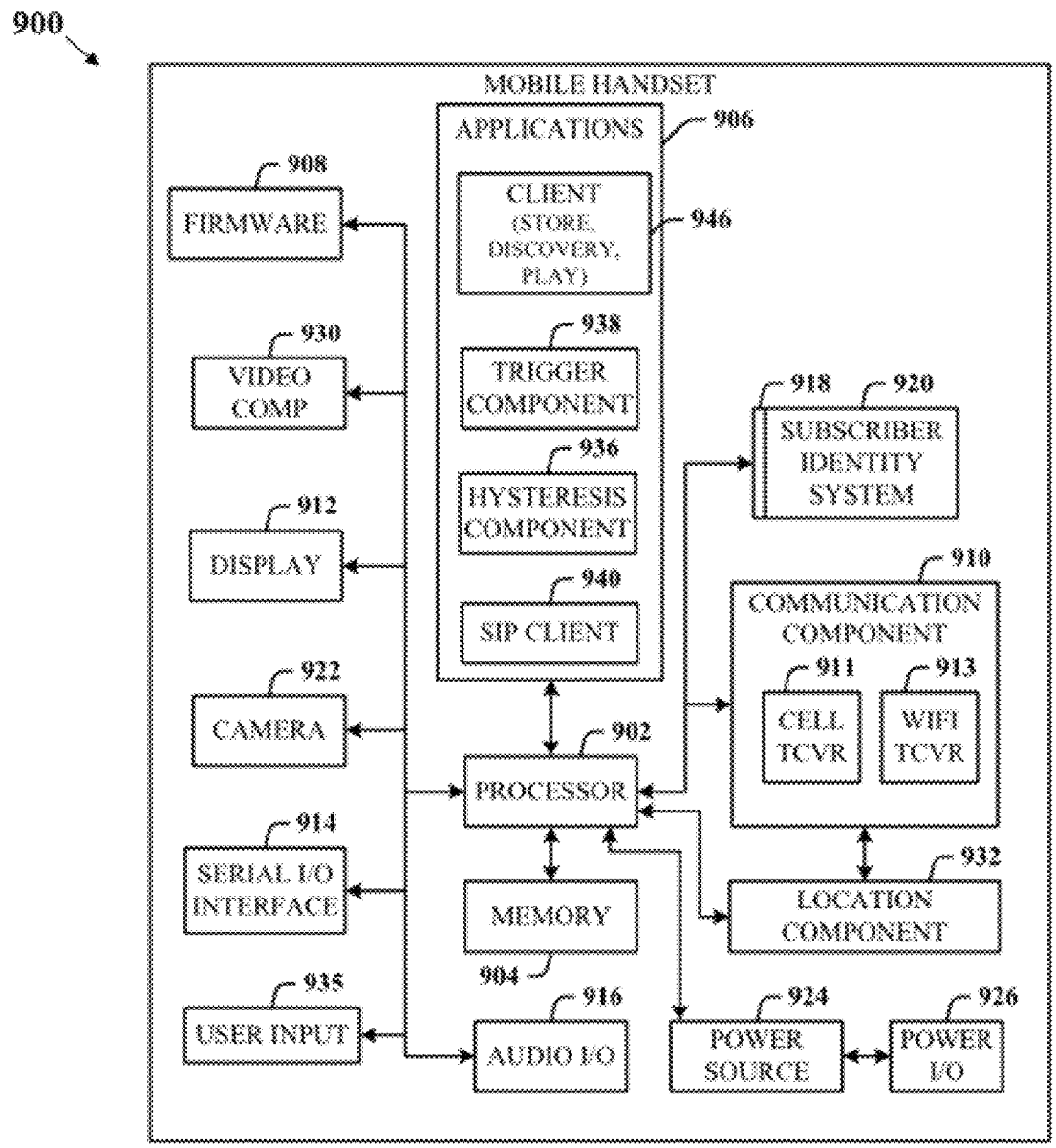
FIG. 9 illustrates a schematic view of an example electronic device of the plurality of electronic devices, in accordance with some example embodiments described herein.

FIG. 9 illustrates a schematic view 900 of an example electronic device of the plurality of electronic devices, in accordance with some example embodiments described herein. The electronic device, in some examples, can correspond to a mobile handset. In some example embodiments, the electronic device illustrated in FIG. 9, can be any device of the plurality of electronic devices 102-10N as described in reference to FIGS. 1-8. For example, in some embodiments, the mobile handset illustrated in FIG. 9 can correspond to the first computing device 102 or the second computing device 104, as described in reference to FIGS. 1-8.

According to some example embodiments, FIG. 9 illustrates is a schematic block diagram of an example end-user device such as a user equipment that can be the first computing device 102 (e.g. a mobile handset) capable of connecting to the communication network (103 and/or 105) in accordance with some embodiments described herein. Although, FIG. 9 illustrates a mobile handset, it will be understood that other devices can be any electronic device as described in FIG. 1, and that the mobile handset is merely illustrated to provide context for the embodiments of the various embodiments described herein. To this end, the following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., described herein in accordance with example embodiments, that can perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

According to some example embodiments, the first computing device 102 can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

According to some example embodiments described herein, a communication media typically embodies computer-readable instructions, data structures, program modules or other data in a modulated data signal such as a carrier wave or other transport mechanism and includes any information delivery media. In this regard, the term "modulated data signal" can correspond to a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

According to some example embodiments, the mobile handset can comprise a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the mobile handset. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The mobile handset can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The mobile handset can also comprise a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This support updating and troubleshooting the mobile handset, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The mobile handset can also comprise a slot interface 918 for accommodating a SIC (Subscriber Identity Component) in the form factor of a card Subscriber Identity Module (SIM) or universal SIM 920 and interfacing the SIM card 920 with the processor 902. However, it is to be appreciated that the SIM card 920 can be manufactured into the mobile handset and updated by downloading data and software.

The mobile handset can also process IP data traffic through the communication component 910 to accommodate IP traffic from an IP network such as, for example, the Internet, a corporate intranet, a home network, a person area network, etc., through an ISP or broadband cable provider.

Thus, VoIP traffic can be utilized by the mobile handset and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The mobile handset also includes a power source 924 in the form of batteries and/or an AC power subsystem, which power source 924 can interface to an external power system or charging equipment (not shown) by a power I/O component 926.

According to some example embodiments, the mobile handset can also comprise a video component 930 for processing video content received and, for recording and transmitting video content. For example, the video component 930 can facilitate the generation, editing and sharing of video quotes. In some example embodiments, a location tracking component 932 facilitates geographically locating the mobile handset. As described hereinabove, this can occur when the user initiates the feedback signal automatically or manually. According to some example embodiments, a user input component 934 facilitates the user initiating the quality feedback signal. In this regard, in some examples, the user input component 934 can also facilitate the generation, editing and sharing of video quotes. According to various example embodiments described herein, the user input component 934 can include such conventional input device technologies such as a keypad, keyboard, mouse, stylus pen, and/or touch screen, for example.

Referring again to the applications 906, a hysteresis component 936 can facilitate the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the mobile handset to support SIP protocols and register the subscriber with the SIP registrar server. In some example embodiments, the applications 906 can also include a client 942 that provides at least the capability of discovery, play and store of multimedia content, for example, music.

In some example embodiments, the mobile handset, as indicated above related to the communications component 910, includes an indoor network radio transceiver 913 (e.g., Wi-Fi transceiver). This function can support the indoor radio link, such as IEEE 802.11, for the dual-mode GSM handset. In some example embodiments, the mobile handset can accommodate at least satellite radio services through a handset that can combine wireless voice and digital radio chipsets into a single handheld device.

Figure 10:
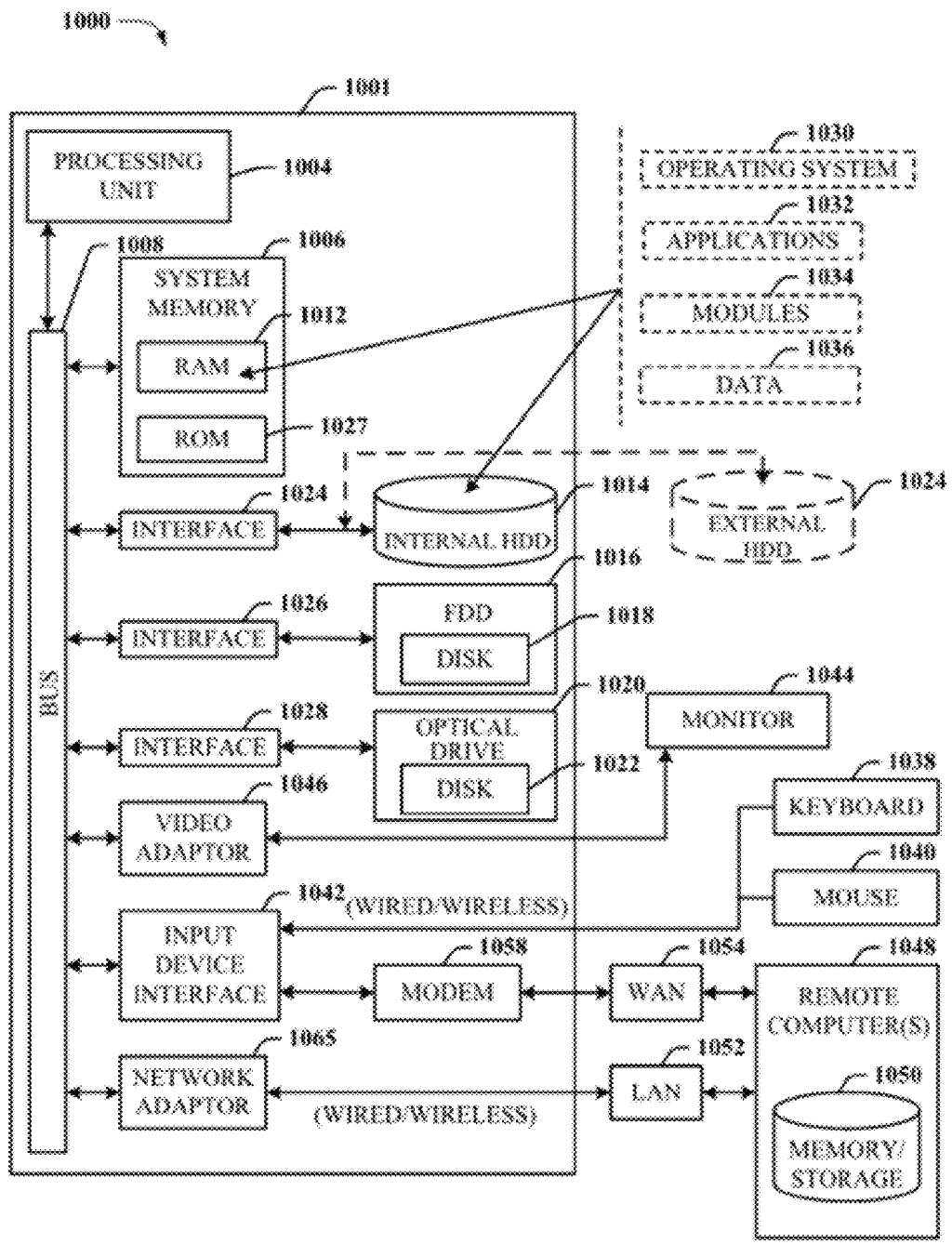
FIG. 10 illustrates a schematic view of an example computing device, in accordance with some example embodiments described herein.

FIG. 10 illustrates a schematic view 1000 of an example computing device 1001 of the plurality of electronic devices 102-10N, in accordance with some example embodiments described herein. The computing device 1001, in some examples, can correspond to a computer. In some example embodiments, the computing device 1001 illustrated in FIG. 10, can be any electronic device of the plurality of electronic devices 102-10N as described in reference to FIGS. 1-9. For example, in some embodiments, the computing device 1001 illustrated in FIG. 10 can correspond to the first computing device 102 or the second computing device 104, as described in reference to FIGS. 1-9.

Referring now to FIG. 10, there is illustrated a block diagram of a computing device 1001 operable to execute the functions and operations performed in the described example embodiments. In some example embodiments, the computing device 1001 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

According to said example embodiments, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, mini-computers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

In accordance with some example embodiments, computing devices typically include a variety of media, which can include computer-readable storage media or communications media, which two terms are used herein differently from one another as follows.

According to some example embodiments, a computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

In some examples, communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can comprise the computing device 1001 comprising a processing unit 1004, a system memory 1006 and a system bus 1008. The system bus 1008 can be configured to couple system components including, but not limited to, the system memory 1006 to the processing unit 1004. In some example embodiments, the processing unit 1004 can be any of various commercially available processors. To this end, in some examples, dual microprocessors and other multiprocessor architectures can also be employed as the processing unit 1004.

According to some example embodiments, the system bus 1008 can be any of several types of bus structure that can further interconnect to a memory bus (with or without a memory controller), a peripheral bus, and a local bus using any of a variety of commercially available bus architectures. In some examples, the system memory 1006 can comprise, read-only memory (ROM) 1027 and random-access memory (RAM) 1012. According to some example embodiments, a basic input/output system (BIOS) is stored in a non-volatile memory 1027 such as ROM, EPROM, EEPROM, which BIOS contains the basic routines that help to transfer information between elements within the computing device 1001, such as during start-up. The RAM 1012 can also comprise a high-speed RAM such as static RAM for caching data.

According to some example embodiments, the computing device 1001 can further comprise an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). In some examples, the hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. According to some example embodiments, the interface 1024 for external drive implementations can comprise, at least one or both of Universal Serial Bus (USB) and IEEE 1394 interface technologies. Other external drive connection technologies are within contemplation of the subject embodiments.

According to some example embodiments described herein, the drives and their associated computer-readable media provide nonvolatile storage of data, data structures, computer-executable instructions, and so forth. For the computing device 1001 the drives and media accommodate the storage of any data in a suitable digital format. Although the description of computer-readable media above refers to a HDD, a removable magnetic diskette, and a removable optical media such as a CD or DVD, it may be appreciated by those skilled in the art that other types of media which are readable by a computing device 1001, such as zip drives, magnetic cassettes, flash memory cards, cartridges, and the like, can also be used in the example operating environment, and further, that any such media can contain computer-executable instructions for performing the methods of the disclosed embodiments.

In some example embodiments, a number of program modules can be stored in the drives and RAM 1012, including an operating system 1030, one or more application programs 1032, other program modules 1034 and program data 1036. To this end, in some examples, all or portions of the operating system, applications, modules, and/or data can also be cached in the RAM 1012. It is to be appreciated that the various embodiments can be implemented with various commercially available operating systems or combinations of operating systems.

According to some example embodiments, a user can enter commands and information into the computing device 1001 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. In some examples, these and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

According to some example embodiments, a monitor 1044 or other type of display device can also be connected to the system bus 1008 through an interface, such as a video adapter 1046. In addition to the monitor 1044, the computing device 1001 can also comprise other peripheral output devices (not shown), such as speakers, printers, etc.

According to some example embodiments, the computing device 1001 can operate in a networked environment using logical connections by wired and/or wireless communications to one or more remote computers, such as a remote computer(s) 1048. In some examples, the remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. According to some example embodiments, the logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

In some examples, when used in a LAN networking environment, the computing device 1001 can be connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

In alternate examples, when used in a WAN networking environment, the computing device 1001 can include a modem 1058, or can be connected to a communications server on the WAN 1054 or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

According to some example embodiments, the computing device 1001 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can further comprise at least Wi-Fi and Bluetooth™ wireless technologies. Thus, the communication can be a predefined structure as with a conventional network or simply an ad hoc communication between at least two devices.

In accordance with some example embodiments, Wi-Fi, or Wireless Fidelity, allows connection to the Internet from a couch at home, a bed in a hotel room, or a conference room at work, without wires. To this end, Wi-Fi referred herein, is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. Further, in accordance with some example embodiments described herein, a Wi-Fi network can be used to connect computers or the plurality of electronic devices 102-10N to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

Figure 11:
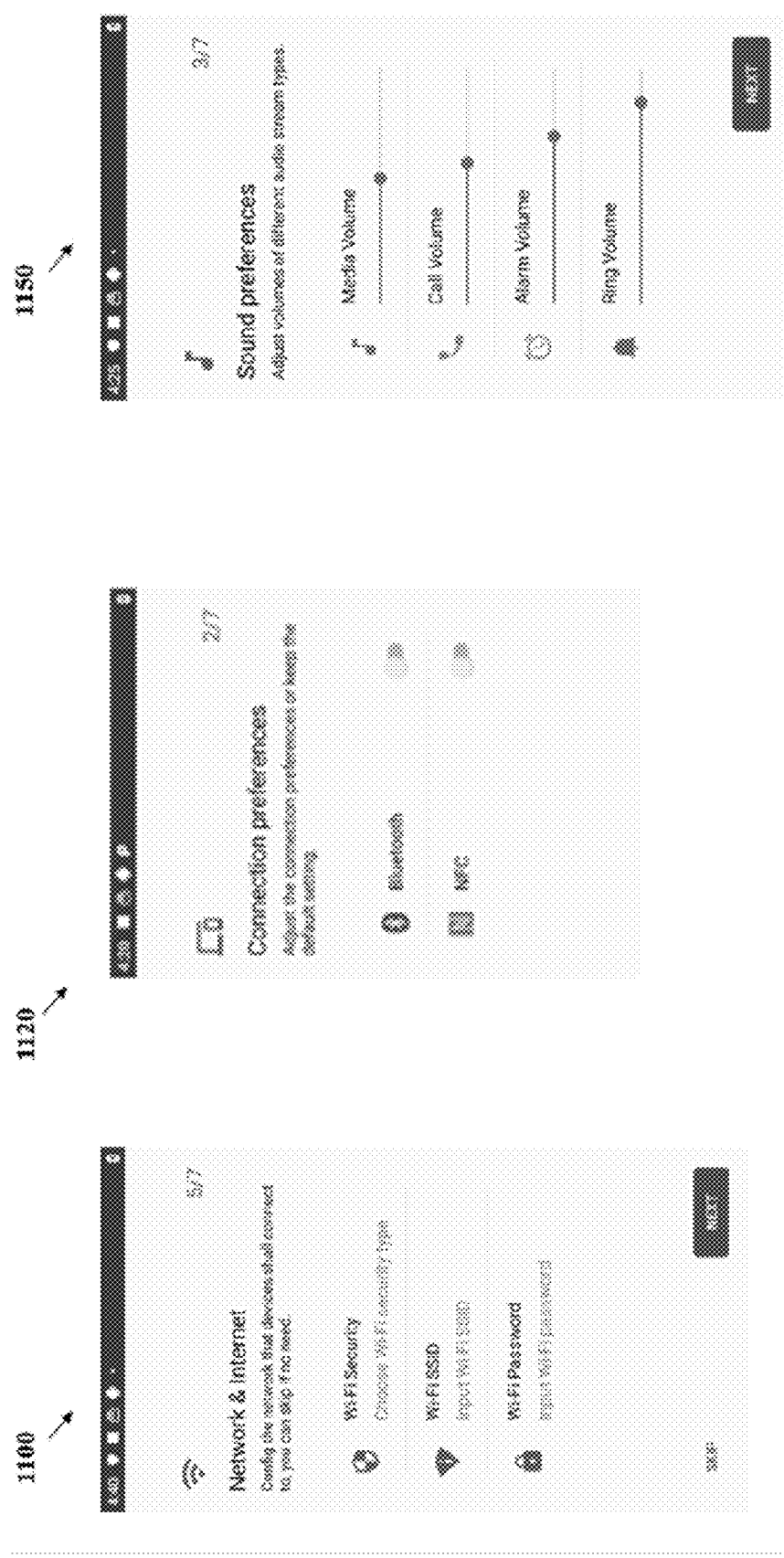
FIG. 11 illustrates exemplary views of user interfaces of various instances of an application used for configuring the plurality of electronic devices, in accordance with some example embodiments described herein.

FIG. 11 illustrates exemplary views (1100, 1120, and 1150) of user interfaces of various instances of an application used for configuring the first computing device 102, in accordance with some example embodiments described herein. Illustratively, a first view 1100 depicts a user interface of a first instance of an application for initializing the communication network 103, as described in FIGS. 2-8.

In some example embodiments, the input/output circuit 114 of the first computing device 102 can be used by a user to provide network configuration parameters (such as, but not limited to, Wi-Fi security, Wi-Fi SSID, Wi-Fi password for setting up an access point (e.g. wireless access point or a Wi-Fi hotspot) at the first computing device 102. In some example embodiments, the network configuration parameters may be built in on the plurality of electronic devices 102-10N, and the application can automatically initiate network configuration at an electronic device (102-10N) as the device is turned ON, for configuring the device based on the network configuration parameters. Illustratively, the second view 1120 depicts another user interface of a second instance of the application for configuring network priority settings of the plurality of electronic devices 102-10N. In this regard, in some examples, a connection preference (e.g. Bluetooth or NFC) of an electronic device can be configured either manually or automatically by the application.

A third view 1150 illustrates, another user interface of a third instance of the application for configuration of sound preferences (e.g. media volume, call volume, alarm volume, ring volume) of the plurality of electronic devices 102-10N. In this regard, in some examples, the sound preferences of the electronic device can be configured either manually or automatically by the application.

According to various example embodiments described herein, a first electronic device (e.g. the first computing device 102) can be initially configured and can further share configuration settings (illustrated in views 800, 820, and 850) to one or more remaining electronic devices that can be communicatively coupled to the first computing device 102. In this regard, the remaining one or more electronic devices (102-10N) can be communicatively coupled to the first computing device 102 and can receive the configuration settings in a manner as described before in reference to FIGS. 2-7. For instance, in some example embodiments, the configuration settings can be shared by an application on the first computing device 102, in response to identifying, other instances of same application initiated at remaining of the plurality of electronic devices 102-10N and knowing information associated with the other instances of the applications at the remaining electronic devices.

In some example embodiments, an application of the plurality of electronic devices 102-10N can provide similar user interfaces as illustrated in FIG. 11 to input configuration files (e.g. XML files, APKs etc.) for configuring the plurality of electronic devices 102-10N. For example, in some embodiments, configuration files can be input, via the input/output circuit 114, on a first instance of application at the first computing device 102 to configure the first computing device 102. Further, in response to identification of a second instance of the same application to be initialized at the second computing device 104, the configuration files can be automatically shared by the first computing device 102 to the second computing device 104, in a manner as described in reference to FIGS. 2-8.

In some examples, the configuration files can be stored on a remote server, for example, the computational platform 106, as described in FIG. 1. To this end, the application on the first computing device 102 can be configured to extract the configuration files from the computational platform 106 and share with remaining of the plurality of electronic devices 102-10N.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any datastream or signaling-stream from a set of subscriber stations. Data and signaling streams can be packetized or framebased flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

It may be noted that, as used in this specification and the appended claims, the singular forms "a," "an" and "the" comprise plural referents unless the content clearly dictates otherwise.

References within the specification to "one embodiment," "an embodiment," "embodiments", or "one or more embodiments" are intended to indicate that a particular feature, structure, or characteristic described in connection with the embodiment is comprised in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Detailed embodiments are disclosed herein; however, it is to be understood that the disclosed embodiments are merely exemplary, which may be embodied in various forms. Therefore, specific structural and functional details disclosed herein are not to be interpreted as limiting, but merely as a basis for the claims.

While it is apparent that the illustrative embodiments described herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A method for configuring a plurality of electronic devices, the method comprising:
   initializing, by a first computing device of the plurality of electronic devices, a communication network based on a pre-defined configuration parameter associated with a first instance of an application executed on the first computing device;
   identifying, by the first computing device, an initialization of a second instance of the application at a second computing device based on a connection request received by the first computing device from the second computing device over the communication network;
   inputting, by the first computing device, a configuration file to configure the first computing device; and
   in response to identifying the initialization of the second instance of the application at the second computing device and establishing a secured communication network between the first computing device and the second computing device based on a secured key exchange between the first computing device and the second computing device, automatically sending, by the first computing device, via the application over the secured communication network, different from the communication network, the configuration file to the second computing device, wherein the secured key exchange is established based on:
receiving, at the first computing device, an encrypted temporary key from the second computing device;
decrypting the encrypted temporary key received at the first computing device;
encrypting, by the first computing device and using the decrypted temporary key, a session key;
sending, by the first computing device, the encrypted session key to the second computing device;
validating, by the first computing device, a configuration request received from the second computing device based on identification of the session key in the configuration request; and
sending, by the first computing device, the configuration file to the second computing device in response to validating the configuration request.

2. The method of claim 1, wherein the pre-defined configuration parameter comprises at least one of a network name, a service set identifier (SSID), and a network security type.

3. The method of claim 1, further comprising:
encrypting, by the first computing device, the pre-defined configuration parameter by a first key shared amongst the plurality of electronic devices;
scanning, by the first computing device, for an incoming connection request to establish the connection with the first computing device over the communication network;
receiving, at the first computing device, the connection request from the second computing device; and
authenticating, by the first computing device, the second computing device based on identification of the pre-defined configuration parameter in the connection request.

4. The method of claim 1, further comprising:
providing, via a user interface of the first computing device, the pre-defined configuration parameter;
configuring the first computing device based on the pre-defined configuration parameter;
upon configuring of the first computing device, initializing the communication network to communicate with the plurality of electronic devices; and
in response to an establishment of the secured communication network between the first computing device and the second computing device, sharing configuration settings by the first computing device to the second computing device over the secured communication network, wherein the configuration settings comprise at least the pre-defined configuration parameter associated with the application.

5. The method of claim 1, wherein the connection is a first connection, and the method further comprising:
establishing a second connection between the first computing device and the second computing device over the secured communication network to exchange communication data comprising configuration settings for the second computing device.

6. The method of claim 5, wherein the secured key exchange is established based on exchanging a private key, a public key, and a session key between the first computing device and the second computing device.

7. The method of claim 5, wherein the secured key exchange is established based on:
receiving, at the first computing device, an encrypted temporary key from the second computing device, wherein the encrypted temporary key corresponds to a temporary key encrypted using a public key shared between the first computing device and the second computing device;
decrypting, using a private key of the first computing device, the encrypted temporary key received at the first computing device;
encrypting, by the first computing device and using the decrypted temporary key, a session key to generate an encrypted session key;
sending, by the first computing device, the encrypted session key to the second computing device;
validating, by the first computing device, a configuration request received from the second computing device based on identification of the session key in the configuration request; and
sending, by the first computing device, the communication data comprising the configuration settings, wherein the communication data is encrypted using the session key.

8. The method of claim 1, wherein the configuration file comprises configuration settings, and wherein the configuration settings correspond to at least one of a volume control setting, a network configuration setting, a sound preference setting, a connection preference setting, associated with the second computing device.

9. A system comprising:
a memory that stores computer-executable instructions; and
a processing unit that executes the computer-executable instructions to perform operations comprising:
initializing a communication network based on a pre-defined configuration parameter associated with a first instance of an application executed on a first computing device;
inputting, by the first computing device, a configuration file to configure the first computing device; and
in response to identifying an initialization of a second instance of the application at a second computing device that is communicatively coupled to the first computing device, and establishing a secured communication network between the first computing device and the second computing device based on a secured key exchange between the first computing device and the second computing device, automatically sending, over the secured communication network, different from the communication network via the application, the configuration file to the second computing device,
wherein the secured key exchange is established based on:
receiving, at the first computing device, an encrypted temporary key from the second computing device;
decrypting the encrypted temporary key received at the first computing device;
encrypting, by the first computing device and using the decrypted temporary key, a session key;
sending, by the first computing device, the encrypted session key to the second computing device;
validating, by the first computing device, a configuration request received from the second computing device based on identification of the session key in the configuration request; and
sending, by the first computing device, the configuration file to the second computing device in response to validating the configuration request.

10. The system of claim 9, wherein the initialization of the second instance of the application at the second computing device is identified based on receiving a connection request from the second computing device over a communication network.

11. The system of claim 9, wherein the pre-defined configuration parameter comprises at least one of a network name, a service set identifier (SSID), and a network security type.

12. The system of claim 9, wherein the connection is a first connection, and wherein the processing unit executes the computer-executable instructions to perform operations comprising:
encrypting the pre-defined configuration parameter by a first key shared amongst a plurality of electronic devices comprising the first computing device and the second computing device;
scanning for an incoming connection request over the communication network;
receiving a connection request to establish a second connection with the second computing device; and
authenticating the second computing device based on identification of the pre-defined configuration parameter in the connection request.

13. The system of claim 9, further comprising:
a plurality of electronic devices comprising the first computing device and the second computing device communicatively coupled over a communication network, wherein the connection is a first connection, and wherein the first computing device comprises the memory and the processing unit that executes the computer-executable instructions to perform operations comprising:
establishing a second connection between the first computing device and the second computing device over the secured communication network to exchange communication data comprising a configuration setting of the second computing device.

14. The system of claim 9, wherein the processing unit executes the computer-executable instructions to perform operations comprising:
establishing the secured key exchange based on exchanging a private key, a public key, and a session key between the first computing device and the second computing device.

15. The system of claim 9, wherein the processing unit executes the computer-executable instructions to perform operations comprising:
providing, via a user interface, the pre-defined configuration parameter;
configuring the first computing device based on the pre-defined configuration parameter;
in response to configuring of the first computing device, initializing a wireless access point by the first computing device to communicate with the second computing device over the communication network; and
in response to an establishment of the secured communication network between the first computing device and the second computing device, sharing a configuration setting of the second computing device over the secured communication network, wherein the configuration setting comprise at least the pre-defined configuration parameter associated with the application.

16. The system of claim 9, wherein the processing unit executes the computer-executable instructions to perform operations comprising:
receiving, at the first computing device, an encrypted temporary key from the second computing device, wherein the encrypted temporary key corresponds to a temporary key encrypted using a public key shared between the first computing device and the second computing device;
decrypting, using a private key of the first computing device, the encrypted temporary key received at the first computing device;
encrypting, by the first computing device, using the decrypted temporary key, a session key to generate an encrypted session key;
sending, by the first computing device, the encrypted session key to the second computing device;
validating, by the first computing device, a configuration request received from the second computing device based on identification of the session key in the configuration request; and
sending, by the first computing device, communication data comprising a configuration setting for the second computing device, wherein the communication data is encrypted using the session key.

17. The system of claim 9, wherein the configuration file comprises a configuration setting, and wherein the configuration setting corresponds to at least one of a volume control setting, a network configuration setting, a sound preference setting, a connection preference setting, associated with the second computing device.

18. A non-transitory computer readable medium that stores thereon computer-executable instructions that in response to execution by a processor, perform operations comprising:
initializing, by a first computing device, a wireless access point on a communication network based on a pre-defined configuration parameter associated with a first instance of an application executed on the first computing device;
identifying, by the first computing device, an initialization of a second instance of the application at a second computing device based on a connection request received by the first computing device from the second computing device to connect with the wireless access point;
inputting, by the first computing device, a configuration file to configure the first computing device; and
in response to identifying the initialization of the second instance of the application at the second computing device based on receiving the connection request from the second computing device and determining that a connection between the first computing device and the wireless access point is established, sending, by the first computing device via the application over a secured communication network, different from the communication network, the configuration file to the second computing device based on a secured key exchange between the first computing device and the second computing device,
wherein the connection is a first connection, and non-transitory computer readable medium stores thereon computer-executable instructions that in response to execution by a processor, perform operations further comprising:
establishing a second connection between the first computing device and the second computing device over the secured communication network to exchange communication data comprising configuration settings for the second computing device, wherein the secured key exchange is established based on:
receiving, at the first computing device, an encrypted temporary key from the second computing device, wherein the encrypted temporary key corresponds to a temporary key encrypted using a public key shared between the first computing device and the second computing device;

decrypting, using a private key of the first computing device, the encrypted temporary key received at the first computing device;

encrypting, by the first computing device and using the decrypted temporary key, a session key to generate an encrypted session key;

sending, by the first computing device, the encrypted session key to the second computing device;

validating, by the first computing device, a configuration request received from the second computing device based on identification of the session key in the configuration request; and sending, by the first computing device, the communication data comprising the configuration settings, wherein the communication data is encrypted using the session key.

19. The non-transitory computer readable medium of claim 18 that stores thereon computer-executable instructions that in response to execution by a processor, perform operations further comprising:

encrypting, the pre-defined configuration parameter by a first key shared amongst a plurality of computing devices;

scanning, for an incoming connection request from the second computing device of the plurality of computing devices to establish the connection with the wireless access point; and authenticating, the second computing device based on identification of the pre-defined configuration parameter in the connection request.

20. The non-transitory computer readable medium of claim 18, wherein the pre-defined configuration parameter comprises at least one of a network name, a service set identifier (SSID), and a network security type associated with the wireless access point, wherein the configuration file comprises configuration settings, and wherein the configuration settings correspond to at least one of a volume control setting, a network configuration setting, a sound preference setting, a connection preference setting, associated with the second computing device.

* * * * *